(12) United States Patent
Smith et al.

(10) Patent No.: US 10,360,392 B2
(45) Date of Patent: Jul. 23, 2019

(54) GENERATING SHARES OF SECRET DATA

(71) Applicant: National ICT Australia Limited, Eveleigh, NSW (AU)

(72) Inventors: Guillaume Smith, Eveleigh (AU); Roksana Boreli, Eveleigh (AU); Arie Friedman, Eveleigh (AU); Mentari Djatmiko, Eveleigh (AU)

(73) Assignee: National ICT Australia Limited, Eveleigh, NSW (AU)

( * ) Notice: Subject to any disclaimer, the term of this patent is extended or adjusted under 35 U.S.C. 154(b) by 194 days.

(21) Appl. No.: 15/500,697

(22) PCT Filed: Jul. 31, 2015

(86) PCT No.: PCT/AU2015/050431
§ 371 (c)(1),
(2) Date: Jan. 31, 2017

(87) PCT Pub. No.: WO2016/015105
PCT Pub. Date: Feb. 4, 2016

(65) Prior Publication Data
US 2017/0228547 A1    Aug. 10, 2017

(30) Foreign Application Priority Data

Aug. 1, 2014   (AU) ................................ 2014902987
Nov. 13, 2014  (AU) ................................ 2014904567

(51) Int. Cl.
*H04L 29/06*    (2006.01)
*G06F 21/60*    (2013.01)
(Continued)

(52) U.S. Cl.
CPC ............ *G06F 21/602* (2013.01); *H04L 9/008* (2013.01); *H04L 9/085* (2013.01); *H04L 9/0819* (2013.01);
(Continued)

(58) Field of Classification Search
CPC ..... G06F 21/602; H04L 9/008; H04L 9/0819; H04L 9/085; H04L 63/0428; H04L 2209/34
See application file for complete search history.

(56) References Cited

U.S. PATENT DOCUMENTS

2010/0217986 A1*  8/2010  Schneider ............... H04L 9/085
                                                        713/171
2013/0272521 A1* 10/2013  Kipnis .................... H04L 9/085
                                                        380/44
(Continued)

OTHER PUBLICATIONS

Appala Naidu Tentu et al., "Ideal and Perfect Hierarchical Secret Sharing Schemes based on MDS codes", "Rao Advanced Institue of Mathematics, Statistics, and Computer Science", Retrieved on Apr. 2, 2013, All Pages.
(Continued)

*Primary Examiner* — Sarah Su
(74) *Attorney, Agent, or Firm* — Kilpatrick Townsend & Stockton LLP

(57) ABSTRACT

This disclosure relates to generating shares of secret data represented by secret data elements based on a first threshold for the number of shares that allow determining the secret data. The shares are determined based on the secret data, one or more random data elements added to the secret data and coefficients of a systematic maximum distance separable (MDS) code. The MDS code has a number of input data elements that is equal to the first threshold and that is also equal to the number of secret data elements plus the number of the one or more random data elements. The method of determining shares can be used for different data sets and multiple pairs of the shares can be generated to allow performing an operation between the first secret data with the second secret data based on distributed processing of each of the multiple pairs.

20 Claims, 7 Drawing Sheets

(51) Int. Cl.
*H04L 9/08* (2006.01)
*H04L 9/00* (2006.01)

(52) U.S. Cl.
CPC ...... *H04L 63/0428* (2013.01); *H04L 2209/34* (2013.01)

(56) References Cited

U.S. PATENT DOCUMENTS

| | | | | |
|---|---|---|---|---|
| 2013/0326264 | A1* | 12/2013 | Resch | G06F 11/1088 714/6.2 |
| 2014/0173270 | A1* | 6/2014 | Matsuo | H04L 9/0869 713/150 |
| 2017/0017581 | A1* | 1/2017 | Huang | G06F 3/0623 |
| 2018/0076953 | A1* | 3/2018 | Resch | G06F 3/0619 |
| 2018/0241548 | A1* | 8/2018 | Dolev | H04L 9/085 |

OTHER PUBLICATIONS

Jun Kurihara et al., "New (k,n)—Threshold Secret Sharing Scheme and Its Extension", KDDI R&D Laboratories, Inc., Retrieved on May 26, 2011, All Pages.

Iwamoto et al., "Strongly secure ramp secret sharing schemes for general access structures", Graduate School of Information Systems: Retreived on Apr. 14, 2005, All Pages.

EP Patent Application No. 15827491.0 filed Jul. 31, 2015, Extended European Search Report dated Mar. 21, 2018, all pages.

Wang Y. et al., "Efficient Secret Sharing Schemes Achieving Optimal Information Rate", *Information Theory Workshop (ITW)*, *2014 IEEE*, Hobart Tasmania, Australia Nov. 2-5, 2014, pp. 516-520.

Cramer R. et al., "Secret Multiparty Computation and Secret Sharing an Information Theoretic Approach", Book Draft, May 2013 downloaded from http://cs.au.dk/~ivan/MPCbook.pdf on Mar. 11, 2015.

Pieprzyk J. et al., "Ideal Threshold Schemes from MDS Codes", *Information Security and Cryptology—ICISC 2002*, Lecture Notes in Computer Science vol. 2587, Springer/Verlag Berlin Heidelberg 2003, pp. 253-263.

Shah N.B. et al., "Secret Share Dissemination Across a Network", available from http://arvix.org/abs/1207.0120, Jun. 2012, pp. 1018.

Smith G. et al., "A Layered Secret Sharing Scheme for Automated Profile Sharing in OSN Groups", Mobile and Ubiquitous Systems: Computing, Networking, and Services: $10^{th}$ International Conference, MOBIQUITOUS 2013, Tokyo, Japan, Dec. 2-4, 2013, *Institute for Computer Sciences, Social Informatics and Telecommunications Engineering*, pp. 487-499.

R.J. McEliece et al., "On Sharing Secrets and Reed-Solomon Codes", University of Illinois at Urbana-Champaign, Communications of the ACM, Sep. 1981, pp. 583-584.

H. Chen et al., "Secure Computation from Random Error Correcting Codes", M. Naor (Ed): EUROCRYPT 2007, LNCS 4515, pp. 291-310, 2007.

M. Paterson et al., "A Simple Combinatorial Treatment of Constructions and Threshold Gaps of Ramp Schemes", D. Stinson's research is supported by NSERC discovery grant 203114-11, Nov. 7, 2012, pp. 1-11.

International Search Report and Written Opinion corresponding to PCT/AU2015/050431, dated Oct. 22, 2015, ten pages.

\* cited by examiner

500

---
Algorithm 1 Share generation from a systematic MDS code
1: procedure $\mathrm{SRS}(G, (S_1, \ldots, S_L)^\mathsf{T})$ ▷ Generation of $n = N - L$ shares
2:    $R \leftarrow G_{\{L+1,\ldots,N\}}$ ▷ $R$ submatrix from $G$ without the $L$ first rows
3:    Let $r_1, \ldots, r_{t-L}$ be $t - L$ random iid values.
4:    $\vec{V} \leftarrow (S_1, \ldots, S_L, r_1, \ldots, r_{t-L})^\mathsf{T}$
5:    $\vec{E} \leftarrow R \cdot \vec{V}$
6:    return $n = N - L$ shares, where share $i$ is $E_i$, and is associated with the row $R_{\{i\}}$.
7: end procedure

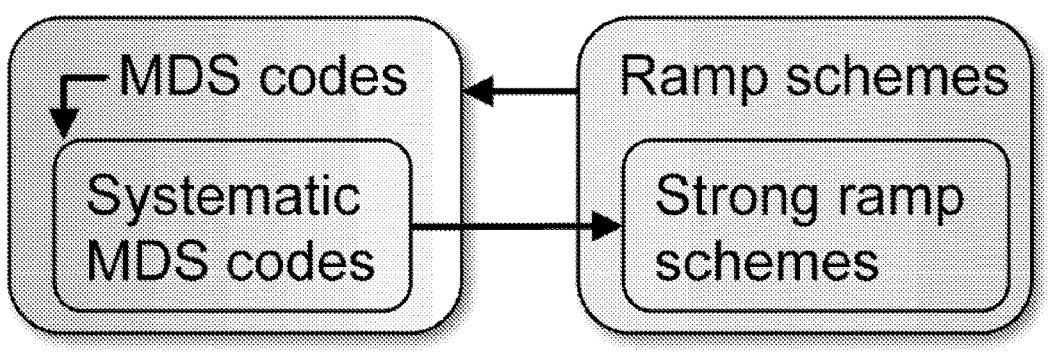

Fig. 6

700 

---

Algorithm 2 Strong ramp scheme from Shamir scheme
---
1: procedure $SSRS((S_1, \ldots, S_L)^\intercal)$ ▷ Generation of $n$ shares
2:     Let $r_1, \ldots, r_{t-L}$ be $t - L$ random iid values.
3:     Choose $n + L$ distinct values $x_0, \ldots, x_{n+L-1}$.
4:     Let $Q(x_{i-1}) = S_i$ for $i \in [1, L]$, and $Q(x_{L+i-1}) = r_i$ for $i \in [1, t - L]$.
5:     Interpolate $Q(x)$ for $x_t, \ldots, x_{n+L-1}$ with $Q(x) = \sum_{i=0}^{t-1} Q(x_i) \prod_{j \neq i} \frac{x - x_j}{x_i - x_j}$.
6:     return $(x_L, Q(x_L)), \ldots, (x_{n+L-1}, Q(x_{n+L-1}))$.
7: end procedure

Fig. 7

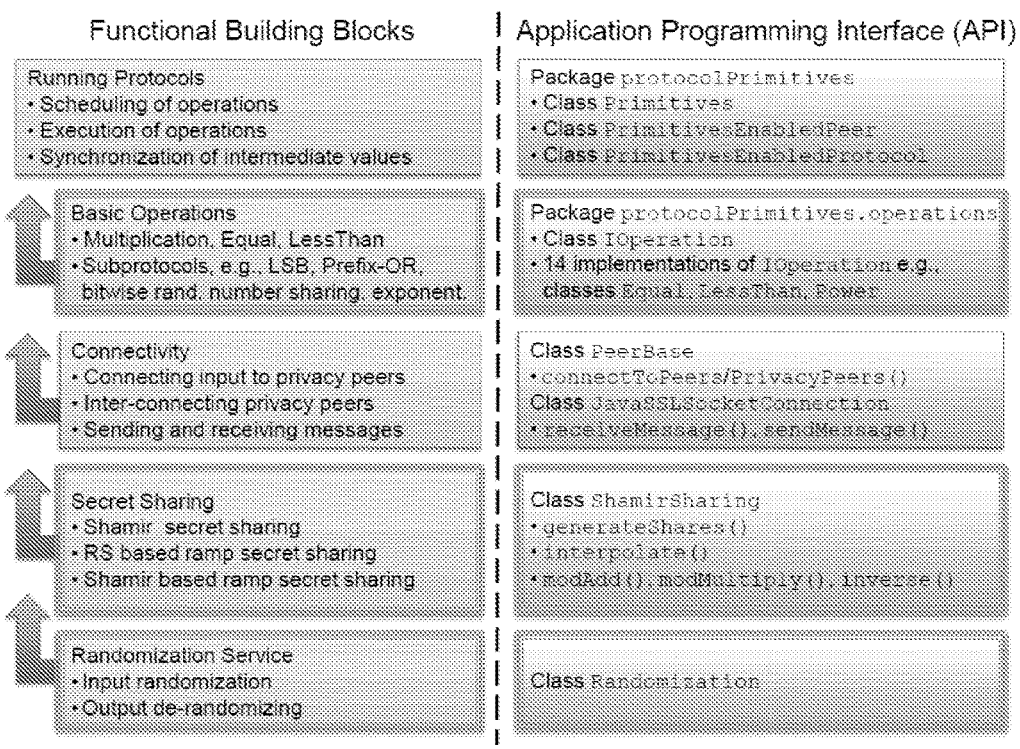

Fig. 8

GENERATING SHARES OF SECRET DATA

CROSS-REFERENCE TO RELATED APPLICATIONS

The present application claims priority from Australian Provisional Application No 2014902987 filed on 1 Aug. 2014 the contents of which are incorporated herein by reference.

The present application also claims priority from Australian Provisional Application No 2014904567 filed on 13 Nov. 2014 the contents of which are incorporated herein by reference.

TECHNICAL FIELD

This disclosure relates to generating shares of secret data. In particular, but not limited to, it relates to systems, software and methods for generating shares of secret data.

BACKGROUND ART

Data from both individuals and businesses is increasingly collected, aggregated and analysed to provide new services. There is a corresponding desire to enable both storage and processing of such data in a secure and privacy-preserving way, in line with the increasing public concerns and strict regulatory requirements for the protection of such data. Secure Multi-Party Computation (MPC) is a mechanism by which a number of parties can collaborate to compute an agreed function of their inputs, ensuring both confidentiality of the data and the integrity of the resulting output. Private computations over distributed data are applicable in many scenarios, allowing multiple organizations to jointly utilize their private or business confidential data to provide a service (e.g., Internet Service Providers troubleshooting network outages), and enabling processing of personal data stored on individuals' mobile devices.

MPC may be based on secret sharing or garbled circuits. In secret sharing, each peer distributes shares that are cryptographically constructed from confidential data (i.e., the secrets), such that only a pre-determined subset of parties can reconstruct the secrets.

Some secret sharing schemes are threshold-based, requiring access to a minimum of t shares to recover the secret, where t is a predetermined threshold. Shamir secret sharing is a threshold scheme that provides perfect secrecy, i.e., no information is leaked by any subset of fewer than t shares. However, the size of each share is at least the size of the secret. Consequently, the use of secret sharing in services that rely on large amounts of data can be severely limited.

This has motivated the study of ramp secret sharing schemes, which allow a controlled leakage of information about the secret when the number of available shares is below t but above a second threshold t−L. The benefit of the relaxed security guarantee is a lower share size, reduced by a factor of L compared to Shamir or other threshold schemes with perfect secrecy. Strong ramp schemes increase the security of generic ramp schemes, by placing the same condition on leakage of any part of the secret, while maintaining the reduced communication overhead.

Despite the promise of strong ramp schemes, there is limited prior work on construction methods for such schemes.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

DISCLOSURE OF INVENTION

There is provided a computer implemented method for generating shares of secret data represented by secret data elements based on a first threshold for the number of shares that allow determining the secret data, the method comprising:

determining the shares of secret data based on
  the secret data elements,
  one or more random data elements added to the secret data elements, and
  coefficients of a systematic maximum distance separable (MDS) code,
wherein the MDS code has a number of input data elements that is equal to the first threshold and that is also equal to the number of secret data elements plus the number of the one or more random data elements.

Adding the random data elements results in a ramp sharing scheme with a second threshold. Any number of shares below the second threshold does not provide any information about the secret.

By adjusting the number of random data elements the second threshold can be adjusted such that the number of shares for which the entropy equals the entropy of secret data is increased. A larger second threshold provides additional value in many applications as it provides an added security guarantee.

Further, the method allows controlled reduction of the entropy of the secret data, while not reducing the entropy of any individual secret data element, when a number of shares is less than the first threshold but greater than the second threshold.

Since the shares of the secret data are determined based on a selectable amount of random data, the method is flexible as it can be adjusted to different second thresholds and different number of shares.

Other methods provide a security guarantee only for the first threshold that allows the recovery of the secret data and no guaranteed protection when a number of shares is less than the first threshold but greater than a second threshold. Therefore, it is an advantage that the proposed method provides a broader range of applications and is more secure that the other methods.

In particular, by adding the random data, the number of shares needed to determine the secret data elements can be increased. Other systems may be secure against a small number of attackers. But when a large number of attackers exist, these systems can be broken and the attackers may learn the secrets. However, when using the above method the system can withstand a large number of attackers and still protect individual secret data elements. This applies to both direct secret sharing and to secure (MPC) computing.

Random data added to the secret data may comprise random data appended to the secret data.

Determining the shares may comprise determining code words of the MDS code as shares such that each of the shares is different to any part of the secret data.

Software, when installed on a computer, causes the computer to perform the above method.

There is further provided a computer system for generating shares of secret data based on a first threshold for the number of shares that allow determining the secret data, the computer system comprising:
an input port to receive the secret data;
a processor to determine the shares of secret data based on
the secret data,
random data added to the secret data, and
coefficients of a systematic maximum distance separable (MDS) code,
wherein the MDS code has a number of input data elements that is equal to the first threshold and that is also equal to the number of secret data elements plus the number of random data elements; and
an output port to send each of the shares to a recipient computer system.

There is further provided a computer implemented method for generating multiple shares of secret data represented by secret data elements based on a first threshold for the number of shares that allow determining the secret data, the method comprising:
determining multiple shares based on the multiple secret data elements and based on one or more random data elements, wherein
determining the multiple shares comprises for each of the multiple shares determining a linear combination of the multiple secret data elements and the random data elements based on one of multiple sets of coefficients,
the multiple sets of coefficients are linearly independent,
the distance between each of the multiple sets of coefficients is maximal,
each of the multiple sets of coefficients comprises exactly the first threshold number of coefficients and comprises exactly the number of secret data elements plus the number of random data elements.

Each of the multiple sets of coefficients may be representative of a row or column of a code generator matrix.

The multiple sets of coefficients may be coefficients of a generator matrix of a systematic maximum distance separable code.

Determining the multiple shares may comprise determining the multiple shares such that L secret data elements can be determined based on a threshold number t of the multiple shares, and determining the multiple shares may comprise determining the multiple shares based on t−L random data elements.

Determining the multiple shares may comprise determining n shares and at least n−t+L sets of coefficients may comprise at least two coefficients greater than zero.

The method may further comprise:
receiving configuration data indicative of the threshold number t, a value n indicative of how many shares are to be determined and a value L indicative of how many shares are required to allow a reduction of uncertainty in relation to the multiple secret data elements; and
determining a measure of redundancy based on t, n and L.

Determining the measure of redundancy may comprise calculating n−t+L.

The method may further comprise determining at least part of a generator matrix for a maximum distance separable code with t input values and n+L output values.

The method may further comprise determining a number of random data elements to be added to the multiple secret data elements based on t and L. Determining the number of random data elements may comprise calculating t−L.

Software, when installed on a computer, causes the computer to perform the above method for generating shares of secret data.

There is further provided a computer system for generating shares of secret data represented by secret data elements based on a first threshold for the number of shares that allow determining the secret data, the system comprising:
an input port to receive the multiple secret data elements;
a processor to determine multiple shares based on the multiple secret data elements and based on one or more random data elements; and
an output port to send each of the multiple shares to a receiving computer system,
wherein
determining the multiple shares comprises for each of the multiple shares determining a linear combination of the multiple secret data elements and the random data elements based on one of multiple sets of coefficients,
the multiple sets of coefficients are linearly independent,
the distance between each of the multiple sets of coefficients is maximal, and
each of the multiple sets of coefficients comprises exactly the first threshold number of coefficients and comprises exactly the number of secret data elements plus the number of random data elements.

There is further provided a computer implemented method for performing an operation between first secret data and second secret data, the method comprising:
performing the above method for generating shares of secret data to determine first shares of the first secret data;
performing the above method for generating shares of secret data to determine second shares of the second secret data;
generating multiple pairs, each of the multiple pairs comprising a first element based on the first shares and a second element based on the second shares to allow performing the operation between the first secret data with second secret data based on distributed processing of each of the multiple pairs.

The operation may be a multiplication of the first secret data with the second secret data.

The first element may be one of the first shares and the second element may be one of the second shares, and generating the multiple pairs of shares may comprise generating all possible combinations of the first shares with the second shares.

The first element may be based on a sum of two first shares and the second element may be based on a sum of two second shares.

Generating the multiple pairs may be according to:

$$\begin{vmatrix} E_1^1, E_1^2 & 0 & \ldots & 0 \\ E_1^1+E_2^1, & E_1^2+E_2^2 & & \vdots \\ \vdots & & \ddots & 0 \\ E_1^1+E_n^1, & E_1^2+E_n^2 & \ldots & E_n^1, E_n^2 \end{vmatrix}$$

where $E_i^1$ is an i-th first share and $E_j^2$ is an j-th second share.

The method may further comprise:
combining the first element with the second element of each pair to obtain combination result for each pair;
determining multiple combination values for each pair based on the combination result and a vector of distribution values;
determining shares of the multiple combination values by performing the above method for generating shares of secret data based on the multiple combination values for each pair; and
distributing the multiple shares to multiple processing peers to allow performing the operation between the first secret data with second secret data based on distributed processing of each of the shares of the multiple combination values.

Software, when installed on a computer causes the computer to perform the above method for performing an operation between first secret data and second secret data.

There is further provided a computer system for performing an operation between first secret data and second secret data. The computer system comprises:
an input port to receive the first secret data and the second secret data;
a processor to
perform the method of claim 1 to determine first shares of the first secret data;
perform the method of claim 1 to determine second shares of the second secret data;
generate multiple pairs, each of the multiple pairs comprising a first element based on the first shares and a second element based on the second shares to allow performing the operation between the first secret data with second secret data based on distributed processing of each of the multiple pairs; and
an output port to send the multiple pairs to one or more receiving computer systems.

Optional features described of any aspect of method, computer readable medium, software or computer system, where appropriate, similarly apply to the other aspects also described here.

BRIEF DESCRIPTION OF DRAWINGS

An example will be described with reference to
FIG. 1 illustrates a computer system for sharing multiple secret data elements.
FIG. 5 illustrates an algorithm that describes how a processor uses a generator matrix $G_{N\times t}$ of a (t,N) systematic MDS code stored on data memory to generate shares from a secret vector.
FIG. 6 summarises the links between different schemes.
FIG. 7 illustrates an algorithm that summarises the process in which n shares are created.
FIG. 8 illustrates functional building blocks and corresponding API elements of a modified SEPIA library.

BEST MODE FOR CARRYING OUT THE INVENTION

Figure 1:
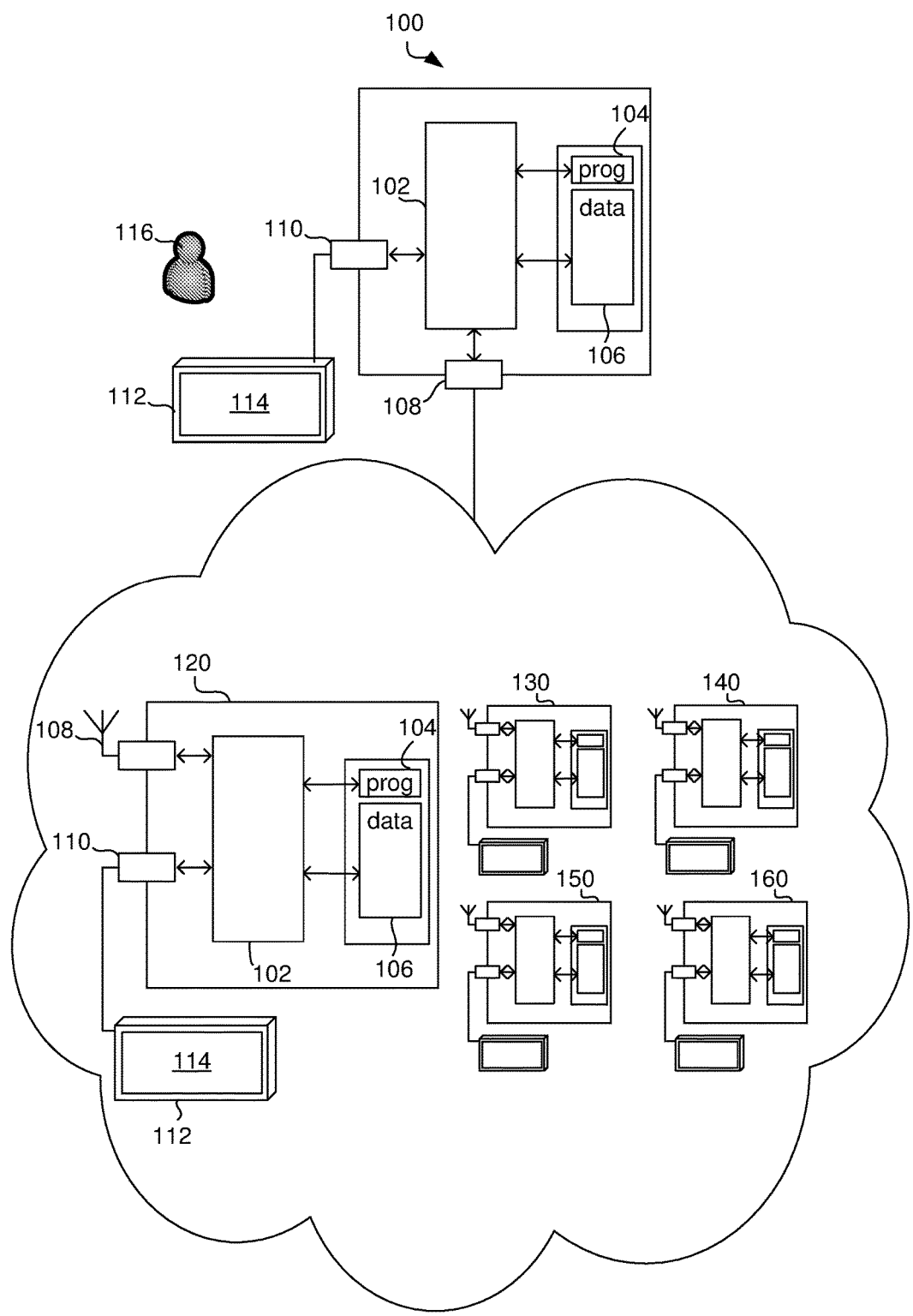

FIG. 1 illustrates a computer system 100 for sharing multiple secret data elements. The computer system 100 comprises a processor 102 connected to a program memory 104, a data memory 106, a communication port 108 and a user port 110. The program memory 104 is a non-transitory computer readable medium, such as a hard drive, a solid state disk or CD-ROM. Software, that is, an executable program stored on program memory 104 causes the processor 102 to perform the method in FIG. 2, that is, processor 102 determines a linear combination of the secret data elements and random data elements based on multiple sets of coefficient. This linear combination may be formulated as a multiplication of the secret data elements in a vector with a generator matrix of a systematic maximum distance separable code.

The processor 102 may then store the result, that is, data elements that represent multiple shares, on data store 106, such as on RAM or a processor register.

FIG. 1 further illustrates multiple participant computer systems 120, 130, 140, 150 and 160, which are referred to as 'participants' in this disclosure. Processor 102 may send the determined shares via communication port 108 to the participants 120, 130, 140, 150 and 160. As shown in relation to example participant 120 and similar to computer system 100, each participant comprises a processor 122, a program memory 124, and a data memory 126.

The processor 102 may receive data, such as secret input data, from data memory 106 as well as from the communications port 108 and the user port 110, which is connected to a display 112 that shows a visual representation 114 of the secret data to a user 116. In one example, the processor 102 receives secret data from a storage server (not shown) via communications port 108, such as by using a Wi-Fi network according to IEEE 802.11. The Wi-Fi network may be a decentralised ad-hoc network, such that no dedicated management infrastructure, such as a router, is required or a centralised network with a router or access point managing the network.

In one example, the processor 102 receives and processes the secret data in real time. This means that the processor 102 determines the shares every time secret data is received from the storage server and completes this calculation before the storage server sends the next secret data update. The secret data may comprise an electronic text document, a media file, such as video or audio, a cryptographic key, personal information, medical data, internet connection data or any other sensitive information. Although communications port 108 and user port 110 are shown as distinct entities, it is to be understood that any kind of data port may be used to receive data, such as a network connection, a memory interface, a pin of the chip package of processor 102, or logical ports, such as IP sockets or parameters of functions stored on program memory 104 and executed by processor 102. These parameters may be stored on data memory 106 and may be handled by-value or by-reference, that is, as a pointer, in the source code.

The processor 102 may receive data through all these interfaces, which includes memory access of volatile memory, such as cache or RAM, or non-volatile memory, such as an optical disk drive, hard disk drive, storage server or cloud storage. The computer system 100 may further be implemented within a cloud computing environment, such as a managed group of interconnected servers hosting a dynamic number of virtual machines. In one example, the participants 120, 130, 140, 150 and 160 are virtual machines in a cloud computing environment.

It is to be understood that any receiving step may be preceded by the processor 102 determining or computing the data that is later received. For example, the processor 102 determines secret data and stores the secret data in data memory 106, such as RAM or a processor register. The processor 102 then requests the secret data from the data memory 106, such as by providing a read signal together with a memory address. The data memory 106 provides the data as a voltage signal on a physical bit line and the processor 102 receives the secret via a memory interface.

Figure 2:
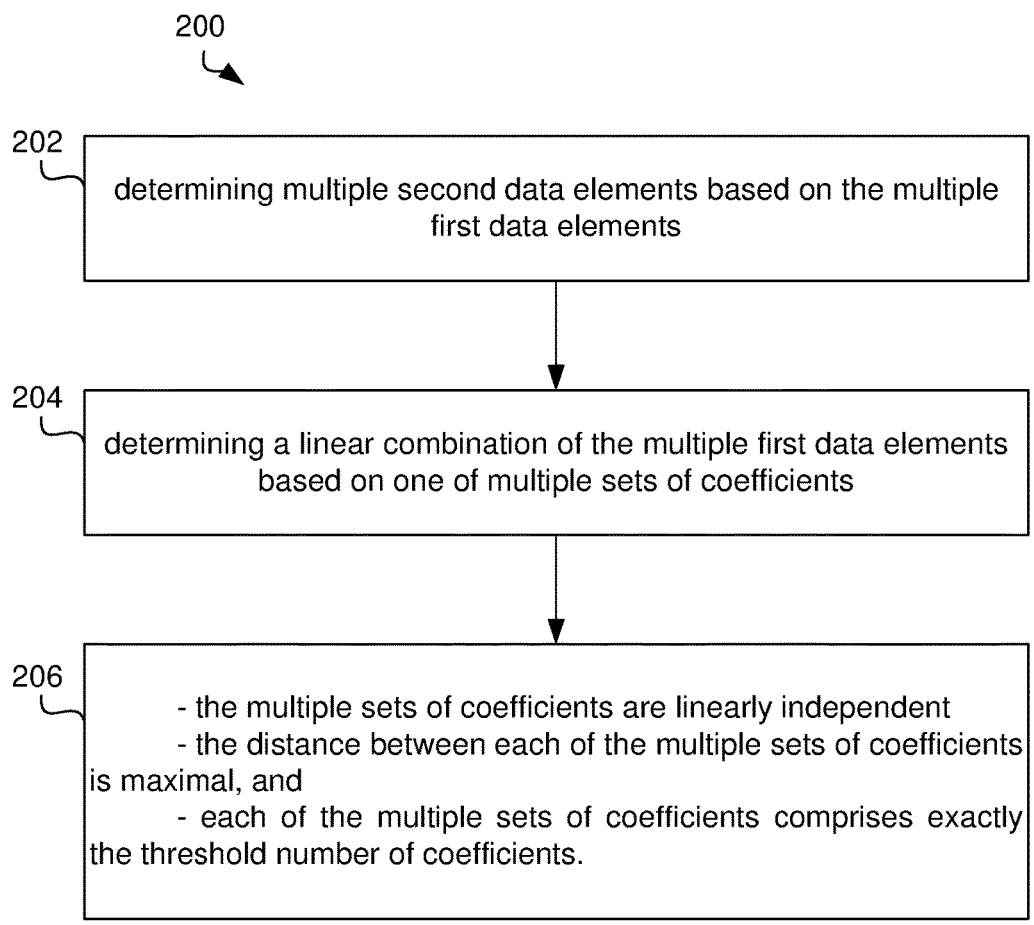
FIG. 2 illustrates a method for sharing multiple secret data elements.

FIG. 2 illustrates a method 200 as performed by processor 102 for sharing multiple secret data elements. The method comprises determining 202 multiple second data elements referred to as 'shares' based on the multiple first data elements such that the multiple secret data elements can be determined based on a threshold number of the multiple shares according to a threshold secret sharing scheme. For example, if the threshold number t is three and processor 102 determines five shares for the five participants 120, 130, 140, 150 and 160, then three shares are sufficient to determine the secret, that is, the multiple first data elements. For example, if participants 130, 140 and 150 collude and exchange their shares they are able to determine the secret.

As will be described in more detail below, determining the multiple shares comprises for each of the multiple shares determining 204 a linear combination of the multiple secret data elements and random data elements based on one of multiple sets of coefficients, such as rows of a matrix. It is to be understood that while some examples relate to rows of a matrix, the same applies to columns because the matrix may simply be transposed.

The multiple sets of coefficients, that is, the rows of the matrix, are 206 linearly independent, the distance between each of the rows is maximal according to a maximum distance separable code and each of the multiple sets of coefficients comprises exactly the threshold number of coefficients.

The distance between two sets of coefficients may be defined as the number of elements that are different. For example, each set may have four coefficients and a first set may be 0000 and a second set may be 0011. In this example, the first set differs from the second set by two coefficients and therefore, the distance between the two sets is two.

Linearity guarantees that the minimum Hamming distance d between a codeword c0 and any of the other codewords c≠c0 is independent of c0. For example, the Hamming code is a linear binary code which represents 4-bit messages using 7-bit codewords. Two distinct codewords differ in at least three bits. As a consequence, up to two errors per codeword can be detected while a single error can be corrected. This code contains $2^4=16$ codewords.

Figure 3:
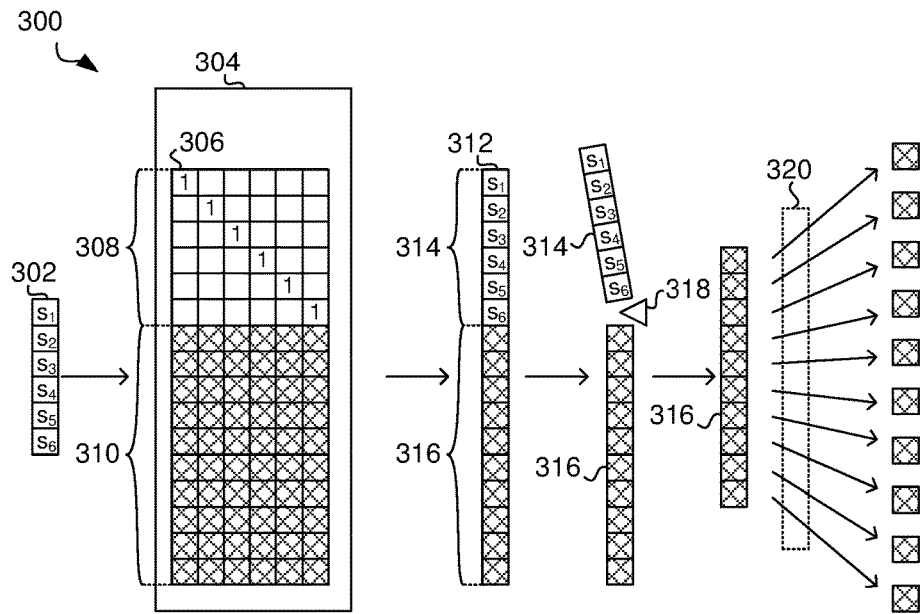
FIG. 3 illustrates an example of a data processing system for sharing multiple secret data elements.

FIG. 3 illustrates an example of a data processing system 300 for sharing multiple secret data elements 302 in an example where six input values are shared (L=6) and the threshold number is also six (t=6). The system 300 comprises a code generator 304 that comprises a generator matrix 306 according to an systematic MDS code. The generator matrix 306 comprises an identity sub-matrix 308, which is also referred to as the 'systematic' part and a non-identity sub-matrix 310 also referred to as the 'non-systematic' part of generator matrix 306. In a coding scheme, the non-identity sub-matrix 310 is used to generate redundancy, while the identity matrix 308 simply copies the input 302 in plain text.

The generator 304 generates an output vector 312 comprising a first section 314 and a second section 316. Since the first section 314 is determined by multiplying the input 302 with the identity matrix 308, the first section 314 is exactly the input 314 and the first section 314 is also referred to as the clear text output 314. The second section 316 is the redundancy generated by multiplying the input 302 by the non-systematic sub-matrix 310 and the second section 316 is also referred to as the redundancy output 316.

The rows of the non-systematic sub-matrix 310 are linearly independent, which allows to reconstruct the input 302 based on six elements of the second section 316. This reconstruction is analogous to solving a linear system of equations for six unknowns when six results are known.

Sending part of the clear text output 314 to a participant would disclose the secret input 302 in plain text, which is undesirable. Therefore, a selector 318 splits the output 312 and selects the redundancy output 316. In some examples, the plain text output 314 is not computed since it is not shared and readily available as the input 302. In those examples, the selector may not be present.

The determined redundancy output 316 is then provided to a distributor 320 that sends each of the individual elements of the redundancy output to a participant.

In one example, each square in FIG. 3, that is, each data element, is a bit that has one of the values '0' and '1'. In other example, each square represents a string or other data element.

Figure 4:
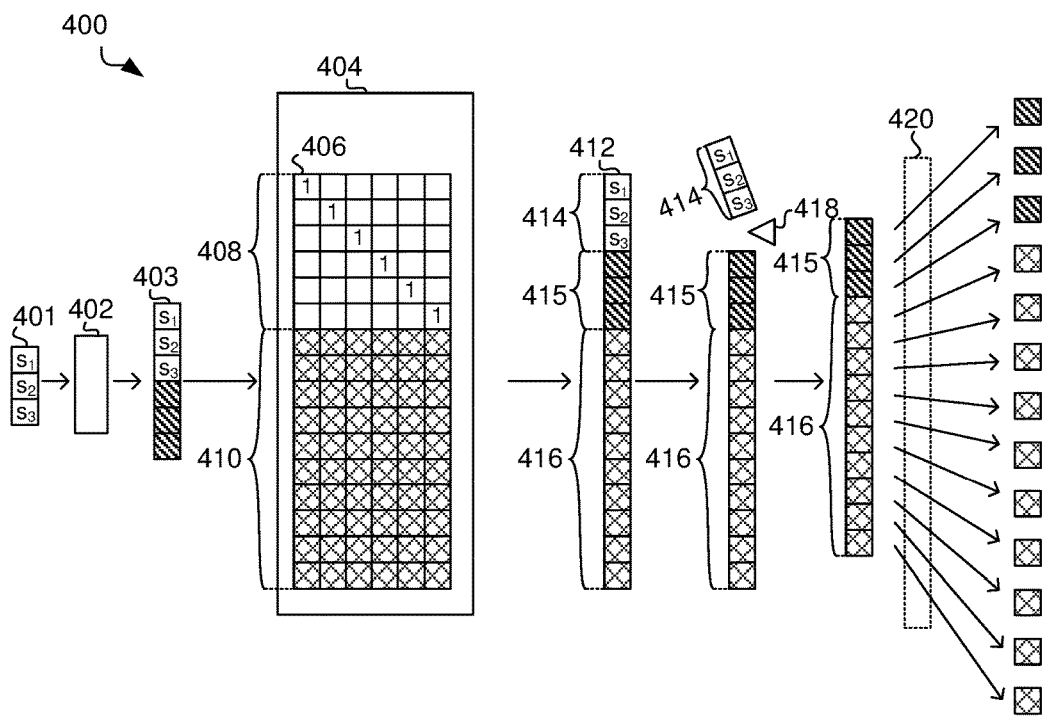
FIG. 4 illustrates another example of a data processing system for sharing multiple secret data elements.

FIG. 4 illustrates another example of a data processing system 400 for sharing multiple secret data elements 401. In this example, only L=3 secret data elements are to be shared and the system 400 is to generate 13 shares. The secret data elements 401 are received by a random data generator 402 that adds three random symbols to the secret data 401 resulting in intermediate data vector 403 comprising three secret data elements and three random data elements. The intermediate data vector 403 is now provided to the generator 404. As described above with reference to FIG. 3, the generator comprises identity matrix 408 and redundancy matrix 410. Accordingly, the output vector 412 comprises the three secret data element 414 in plain text, the three random symbols 415 in plain text as generated by the random data generator 402 and ten redundancy symbols 416.

It is noted here that some redundancy symbols may be the same as in FIG. 3 while some redundancy symbols change because of the random numbers added to the system. This depends on the last three columns of the generator matrix 406. If the coefficients of row i of the last three columns are all zero, then the random numbers have no influence on the i-th share and therefore, the share does not change if the last three secret data elements change to a random value.

A splitter 418 discards the plain text secret data 414 and selects the random elements 415 and the redundancy elements 416, which results in 13 shares in this example. A distributor 420 distributes the 13 shares to 13 participants.

If six participants collude and combine their shares, they can determine the secret data 401. If five, four or three participants combine their shares, they can derive some information about the secret 401. In other words, the entropy given five, four our three shares is less than the entropy if less than three shares are given. In the example of binary information, the reduction of entropy by one bit reduces the number of guesses of a brute force attach by 50%. So as a result, the third, fourth and fifth share each reduce the number of guesses for a brute force attack but no not allow the direct calculation of the secret, which is possible with six shares.

Secret sharing is an important primitive in many protocols for Secure Multi-Party Computation (MPC), and Shamir secret sharing scheme is one scheme used in MPC. However, Shamir scheme introduces a significant communication overhead, which may limit its applicability in MPC scenarios involving large volumes of data. Strong ramp schemes, which have been proposed to alleviate the overhead issue, present a compromise between efficiency and the level of security.

This disclosure describes a novel construction method for strong ramp schemes, by demonstrating that the shares of a strong ramp scheme can be directly extracted from the encoded packets of a systematic Maximum Distance Separable (MDS) code. This construction allows a large number of existing efficient implementations of MDS codes to be leveraged towards secret sharing and MPC applications.

We also propose an additional construction method based on Shamir secret sharing. We then evaluate the performance benefits of strong ramp schemes in MPC by implementing two of these schemes in the SEPIA MPC framework, and comparing them with the Shamir secret sharing scheme. We show that in a network outage monitoring scenario with 20 MPC input peers and 20 privacy peers, the processing time can be reduced by a factor of 10, and the communication overhead can be lowered by 20 times, compared to MPC using the Shamir scheme.

Threshold Secret Sharing Schemes

In a threshold secret sharing scheme, a dealer computer 100 securely shares a secret S with a group of n participants, such as participant computers 120, 130, 140, 150 and 160, by generating n shares $E_1, \ldots, E_n$ and distributing them to the participants. The secret can be recovered by aggregating a subset of t or more shares, where $t \leq n$ is a predetermined threshold, and the secret remains protected if a lower number of shares is available. Formally:

Definition 1 (Threshold Secret Sharing Scheme)

Let S be a secret and $E_1, \ldots, E_n$ shares. A (t,n) threshold secret sharing scheme satisfies the following property: for any set of indices $i_1, \ldots, i_x$, where x is the number of available shares:

$$H(S \mid E_{i_1}, \ldots, E_{i_x}) = \begin{cases} H(S), & \text{if } x < t \\ 0, & \text{if } t \leq x \leq n \end{cases}.$$

H(S) denotes the Shannon entropy function of a random variable S, with values from a finite non empty set F:

$$H(S) = -\sum_{s \in F} P(S = s) \cdot \log_2(P(S = s)).$$

P(S=s) is the probability of S having a specific value $s \in F$, therefore the entropy measures the uncertainty related to the expected value of S. H(S|E) denotes the conditional entropy, measuring the uncertainty of S when E is known.

An advantage of linear schemes (constructed from a linear combination of finite field elements) is that the linear properties facilitate share-based secure computations. An example linear threshold scheme is the Shamir scheme.

In the Shamir scheme, operations are based on a selected Galois (finite) field GF. Given a chosen threshold t, the processor 102 of the dealer computer 100 constructs a polynomial Q(x) of degree t−1, $Q(x) = S + \sum_{i=1}^{t-1} r_i x^i$, where the coefficients $r_1, \ldots r_{t-1}$ are chosen randomly from GF. The shares $E_1, \ldots, E_n$ are then constructed as values of Q(x), for n non-zero values, $x_1, \ldots, x_n$, i.e., $E_i = (x_i, Q(x_i))$. A secret can be reconstructed by any participant who is in possession of t or more shares, by using the Lagrange interpolation polynomials, with $$S = Q(0) = \sum_{j=1}^{t} Q(x_{i_j}) \prod_{l \neq j} \frac{-x_{i_l}}{x_{i_j} - x_{i_l}}.$$

We note that the size of each share in the Shamir scheme is identical to the size of the secret, resulting in a large communication overhead when the secret is large.

Security

There are two types of attacks commonly considered in secret sharing: a collusion attack, where the attackers are honest but curious (they follow the protocol) and a malicious attack, where some parties could also distort their shares, or deviate from the secret sharing protocol.

A threshold (t,n) secret sharing scheme is resilient to up to t−1 honest but curious attackers as, by Definition 1, any subset of fewer than t shares does not provide any information about the secret.

Ramp Schemes

Ramp schemes enable secret sharing with a lower communication overhead. A (t,L,n) ramp scheme includes an additional parameter L, which differentiates between the security guarantee and the number of shares t required to reconstruct the secret. In ramp schemes, having more than t−L (but less than t) available shares will leak partial information about the secret. The lower bound for the size of each share is the size of the secret divided by L. A ramp scheme is said to be optimal when the share size is equal to the lower bound. In this disclosure the ramp schemes are linear. Formally:

Definition 2 (Linear Ramp Secret Sharing Scheme)

Let S be a secret and $E_1, \ldots, E_n$, shares. A (t,L,n) linear ramp secret sharing scheme satisfies the following properties, for any set of indices $i_1, \ldots, i_x$, where x is the number of available shares:

$$H(S \mid E_{i_1}, \ldots, E_{i_x}) = \begin{cases} H(S), & \text{if } x < t - L \\ \frac{t-x}{L} H(S), & \text{if } t - L \leq x < t \\ 0, & \text{if } t \leq x \leq n \end{cases}$$

We note that with L=1, the scheme becomes a threshold (t,n) secret sharing scheme. As they result in a lower communication cost, ramp schemes are well suited to sharing large secrets, or multiple secrets. In either scenario, the secret S can be represented as a vector $\vec{S}=(S_1, \ldots, S_L)^T$, where each element of $\vec{S}$ is of equal size $$\frac{|\vec{S}|}{L}$$

and the elements $S_i$ are random independent values or can be made so by a randomization pre-processing technique [14].

The definition of ramp schemes provides a bound on the information leakage for the whole secret, rather than for any subset of the secret vector $\vec{S}$. In fact, the dealer could share (directly) any single element of $\vec{S}$ and still satisfy the conditions for a ramp scheme in which L=t. E.g., if $S_1$ is revealed, and assuming equal entropy for all elements in $\vec{S}$, $$H(\vec{S}\mid S_1) = \frac{t-1}{t}H(\vec{S}).$$

Strong ramp schemes address this deficiency and provide a stronger security guarantee. In this disclosure, we focus on the ramp schemes based on linear operations on GF. These are defined as follows:

Definition 3 (Strong Linear Ramp Scheme)

Let $\vec{S}=(S_1, \ldots, S_L)^T$ be a vector secret and $E_1, \ldots, E_n$ shares. A (t,L,n) strong linear ramp scheme satisfies the following properties, for any set of indices $i_1, \ldots, i_x$, where x is the number of available shares:

$$H(\vec{S}\mid E_{i_1}, \ldots, E_{i_x}) =$$

$$\begin{cases} H(\vec{S}), & \text{if } x < t-L \\ H(S_{j_1}, \ldots, S_{j_{t-x}} \mid E_{i_1}, \ldots, E_{i_x}) = \frac{t-x}{L}H(\vec{S}), \\ \quad \text{if } t-L \le x < t \text{ for any set of indices } j_1, \ldots, j_{t-x} \\ 0, & \text{if } t \le x \le n \end{cases}$$

The definition of strong ramp scheme requires that the entropy of any subset of secret (vector) elements (rather than just the secret as a whole) is bounded to a specific value of $$\frac{t-x}{L}H(\vec{S}),$$

which maximizes the uncertainty provided by such a scheme.

Security

A (t,L,n) strong ramp scheme is resilient to up to t−1 colluding attackers assuming a less stringent security requirement, where the attackers may obtain some knowledge about vector elements of the secret vector (see Definition 3). For a requirement that the attackers obtain no knowledge of the secret, the scheme is resilient to t−L colluding attackers.

MDS Codes

Error correction codes may be used to recover information in lossy environments. Linear codes are constructed using a linear combination of information elements. In a (t,N) code, a vector $\vec{S}$ of t information elements (packets) is encoded into a vector (codeword) of N≥t packets using a generator matrix G of size N×t; the codeword is obtained via $\vec{C}=G\cdot\vec{S}$.

A Maximum Distance Separable (MDS) code is a (t,N) linear code that achieves the Singleton bound [25], with properties that ensure the maximum utilization of redundancy. Consequently, it can correct up to (N−t)/2 errors or (N−t) erasures.

An alternative definition is as follows.

Definition 4 (MDS Code)

A (t,N) code is MDS if any square sub-matrix of size t derived from its generator matrix $G_{N\times t}$ is non-singular.

We note that coding operations are defined on a Galois field GF, based either on a prime number p, i.e., GF(p), or a power of a prime $GF(p^q)$, where q is an integer. Reed-Solomon (RS) codes are MDS codes, with a generator matrix that can be based on either Vandermonde or Cauchy matrices [26], [24].

Definition 5 (Systematic MDS Code)

A (t,N) MDS code is systematic if every codeword of N elements includes the (non-transformed) t elements comprising the vector $\vec{S}$. I.e., the identity matrix of size t, $I_t$, is a submatrix of the generator matrix G.

All MDS codes based on a Cauchy matrix are systematic. We note that MDS codes based on a Vandermonde matrix are not always systematic, however, non-systematic codes can be transformed into a systematic variant.

Theorem 1 Let A be a t×t matrix of rank t and B a (N−t)×t matrix of rank min(N−t,t) such that any square submatrix of size t from $$\begin{pmatrix} A \\ B \end{pmatrix}$$

has a rank equal to t (i.e., $$\begin{pmatrix} A \\ B \end{pmatrix}$$

generates a MDS code). Then the matrix $$\begin{pmatrix} I_t \\ B\cdot A^{-1} \end{pmatrix}$$

generates a (t,N) systematic MDS code.

Secure Multi-Party Computation (MPC)

MPC enables secure computation based on private input data. Given input data from m parties (input peers), MPC is a cryptographic protocol that enables n distributed parties (privacy peers) to jointly compute functions, while providing formal guarantees on the confidentiality of the input data and on the correctness of the computation result. A party can have one or both roles in the MPC protocol.

Some MPC methods may use secret sharing such as the Shamir scheme [3]. To perform a secure computation, the input peers generate shares of their data, and distribute them to the privacy peers (typically one share per peer). The privacy peers compute the required operation and collaboratively reconstruct the final computation result, which is finally returned to input peers.

TABLE 1

Notations used to describe the ramp schemes and MDS codes

| Notation | Description |
|---|---|
| n | Number of shares generated by a secret sharing scheme, equivalent to the number of privacy peers |
| t | Security threshold for secret sharing schemes, equivalent to the minimum number of packets required to decode an erasure code |
| L | t − L being the second security threshold for ramp schemes |
| N | Codeword size (number of packets) for an erasure code |
| $G_{N \times t}$ | Generator matrix of a (t, N) MDS code. |
| $\vec{S} = (S_1, \ldots, S_L)^T$ | Secret, a vector of L elements (packets) |
| $\vec{E} = (E_1, \ldots, E_n)^T$ | Vector of n encoded elements (packets), or a vector of n shares generated by a secret sharing scheme |
| $\vec{V} = (S_1, \ldots, S_L, r_1, \ldots, r_{t-L})^T$ | Vector secret padded with random elements (used in the process of generating the shares) |
| $M_{\{i_1, \ldots, i_j\}}$ | The submatrix of any matrix M built from its rows $i_1, \ldots, i_j$ |
| $I_t$ | Identity matrix of size t |
| $0_{i,j}$ | Zero matrix of size i × j |

Links Between Ramp Schemes and MDS Codes

We provide proofs for the links between ramp schemes and MDS codes. One goal is to to enable the practical use of strong ramp schemes in MPC, by providing construction methods that utilize the systematic MDS codes and their (available) efficient implementations. We also derive a method to construct a strong ramp scheme from Shamir scheme.

Deriving a Strong Ramp Scheme from a Systematic MDS Code

We will prove that strong ramp schemes can be derived from systematic MDS codes. To do so, we will first describe how processor 102 uses a generator matrix $G_{N \times t}$ of a systematic (t,N) MDS code to generate n=N−L shares out of L secrets. According to Definition 5, we can assume without loss of generality that the matrix G is of the form $$G = \begin{pmatrix} I_t \\ A \end{pmatrix},$$

where $I_t$ is the t×t identity matrix. We will then prove that this construction defines a strong ramp scheme. In what follows we will use $0_{m,n}$ to denote a m×n zero matrix, and $M_{\{i\}}$ to denote the i'th row of a matrix M.

FIG. 5 illustrates an algorithm 500 that describes how processor 102 uses a generator matrix $G_{N \times t}$ of a (t,N) systematic MDS code stored on data memory 106 to generate shares from a secret vector $(S_1, \ldots, S_L)$, where L≤min(t,N−t). Algorithm 500 is implemented as software in source code and stored on program memory 104 in compiled or un-compiled (script) form.

To this end, a submatrix $R_{(N-L) \times t}$ is obtained by taking the last N−L rows of G. Then, the secret vector $\vec{S}$ is extended to a vector $\vec{V}$ of length t by appending to it t−L random values. Finally, the result of $R \cdot \vec{V}$ is a vector that constitutes the N−L shares, where each share is associated with the respective row of R that generated it (i.e., $E_i = R_{\{i\}} \cdot \vec{V}$). The matrix R and the assignment of rows $R_{\{i\}}$ to participants and their shares are assumed to be public knowledge.

Any subset $\vec{E}' = \{E_{i_1}, \ldots, E_{i_t}\}$ of t shares, associated with a subset of the rows of R, is sufficient to reconstruct the vector $\vec{V}$: The rows $R_{\{i_1\}}, \ldots, R_{\{i_t\}}$ form a square matrix R', which is guaranteed to be non-singular since it is a submatrix of G, a generator matrix of MDS code. Therefore, there is only a single solution to $R' \cdot \vec{X} = \vec{E}'$, and since $\vec{V}$ is a valid solution, necessarily $\vec{X} = \vec{V}$, and the first L elements of this vector are the recovered shared secrets.

Theorem 2

Let G be a generator matrix of a (t,N) systematic MDS code. Then, for any L≤min(t,N−t), the share generation algorithm SRS(G,•) (Algorithm 500) is a (t,L,N−L) strong ramp scheme.

We note that the addition of t−L random values to the vector $\vec{V}$ matches the lower bound for the randomness that is used to obtain a ramp scheme.

Proof.

Let $\vec{S} = (S_1, \ldots, S_L)^T$ be a vector consisting of L secrets to share. Algorithm 500 extracts from the matrix G the submatrix $$R = \begin{pmatrix} 0_{t-L,L} & | & I_{t-L} \\ & A & \end{pmatrix}.$$

Recall that $\vec{V} = (S_1, \ldots, S_L, r_1, \ldots, r_{t-L})^T$. Therefore, the computation $\vec{E} = R \cdot \vec{V}$ in line 1 results in N−L shares of the form $\vec{E} = (E_1, \ldots, E_{t-L}, \varepsilon_1, \ldots, \varepsilon_{N-t})^T$, where $E_i = r_i$ and $\varepsilon_j = A_{\{j\}} \cdot \vec{V}$. We will next show that the described scheme maintains the three conditions of Definition 3.

1. For any x<t−L, $H(\vec{S}|E_{i_1}, \ldots, E_{i_x}) = H(\vec{S})$: According to entropy properties, $H(\vec{S}|E_{i_1}, \ldots, E_{i_x}) \leq H(\vec{S})$ always holds. We will show that for x=t−L, $H(\vec{S}|E_{i_1}, \ldots, E_{i_{t-L}}) = H(\vec{S})$. Since for any x<t−L, $$H(\vec{S}|E_{i_1}, \ldots, E_{i_x}) \geq H(\vec{S}|E_{i_1}, \ldots, E_{i_{t-L}})$$

(adding known information can only reduce entropy), this will also prove $H(\vec{S}|E_{i_1}, \ldots, E_{i_x}) \geq H(\vec{S})$.

To prove $H(\vec{S}|E_1, \ldots, E_{i_{t-L}}) = H(\vec{S})$, we will show that any possible set of secrets $\vec{S}'$ is consistent with the t−L shares, i.e., we will find a vector $\vec{V}'$ that extends $\vec{S}'$ such that $E_i = R_{\{i\}} \cdot \vec{V}'$ holds for all the provided shares. To find this vector, we construct a square matrix B as a submatrix of G, in the following way: the first L rows of B will be the first rows of G, which are of the form $(I_L | 0_{t-L,L})$. The remaining t−L rows of B will be the rows of R corresponding to the given shares, i.e., $R_{\{i_1\}}, \ldots, R_{\{i_{t-L}\}}$. To summarize, the matrix B is of the form:

$$B = \begin{pmatrix} I_L & | & 0_{t-L,L} \\ R_{\{i_1, \ldots, i_{t-L}\}} & & \end{pmatrix}. \qquad (1)$$

Next, consider the following problem:

$$B \cdot \vec{X} = (S'_1, \ldots, S'_L, E_{i_1}, \ldots, E_{i_{t-L}})^T. \quad (2)$$

Since matrix B is a square submatrix of size t of G, it is non-singular, and therefore there exists one and only one solution for $\vec{X}$, which we will denote $\vec{V}'$. The selection of the first rows of B ensures that the first elements in $\vec{V}'$ are $S'_1, \ldots, S'_L$, so $\vec{V}'$ extends $\vec{S}'$. The selection of the remaining rows of B ensures that $\vec{V}'$ is also consistent with the shares: for example, for the share $E_{i_1}$ (and any of the other given shares), there is a row j in B such that $B_{\{j\}} = R_{\{i_1\}}$, and therefore $R_{\{i_1\}} \cdot \vec{V}' = B_{\{j\}} \cdot \vec{V}' = E_{i_1}$ as required. To summarize, we showed that any vector of secrets is consistent with a subset of x=t−L shares, so the entropy of the secret vector is not reduced given the shares. This extends also to any smaller subset of shares.

2. For any $$t - L \le x < t,$$

$$H(\vec{S} \mid E_{i_1}, \ldots, E_{i_x}) = H(S_{j_1}, \ldots, S_{j_{t-x}} \mid E_{i_1}, \ldots, E_{i_x}) = \frac{t-x}{L} H(\vec{S})$$

for any set of indices $j_1, \ldots, j_{t-x}$: Since all the elements of the vector $\vec{S}$ are independent, $$H(\vec{S}) = \sum_{i=1}^{L} H(S_i) = L \cdot H(S_j) \text{ for any } j \in [1, L]. \quad (3)$$

Therefore, $$H(S_{j_1}, \ldots, S_{j_{t-x}}) = \frac{t-x}{L} H(\vec{S}).$$

In addition, because of arguments similar to those used to show $H(\vec{S} \mid E_{i_1}, \ldots, E_{i_{t-L}}) = H(\vec{S})$ in the first part of the proof, it follows that $$H(S_{j_1}, \ldots, S_{j_{t-x}} \mid E_{i_1}, \ldots, E_{i_x}) = H(S_{j_1}, \ldots, S_{j_{t-x}}) \text{ and therefore}$$

$$H(S_{j_1}, \ldots, S_{j_{t-x}} \mid E_{i_1}, \ldots, E_{i_x}) = \frac{t-x}{L} H(\vec{S}).$$

It remains to show that $$H(\vec{S} \mid E_{i_1}, \ldots, E_{i_x}) = \frac{t-x}{L} H(\vec{S}).$$

Based on the properties of conditional entropy:

$$H(\vec{S} \mid E_{i_1}, \ldots, E_{i_x}) = H(S_1, \ldots, S_{t-x} \mid E_{i_1}, \ldots, E_{i_x}) + H(S_{t-x+1}, \ldots, S_L \mid E_{i_1}, \ldots, E_{i_x}, S_1, \ldots, S_{t-x}). \quad (4)$$

We have shown that $$H(S_1, \ldots, S_{t-x} \mid E_{i_1}, \ldots, E_{i_x}) = \frac{t-x}{L} H(\vec{S}).$$

Consider the matrix $$B = \begin{pmatrix} I_{t-x} \mid 0_{t-x,t} \\ R_{\{i_1, \ldots, i_x\}} \end{pmatrix}.$$

It is a square submatrix of G of size t, and therefore non-singular. Consequently, the linear system $$B \cdot \vec{X} = (S_1, \ldots, S_{t-x}, E_{i_1}, \ldots, E_{i_x})^T - 0.5em$$

has the unique solution $\vec{X} = \vec{V}$, i.e., the set $S_{t-x+1}, \ldots, S_L$ can be reconstructed with a probability of 1 given $S_1, \ldots, S_{t-x}$, $E_{i_1}, \ldots, E_{i_x}$, so $$H(S_{t-x+1}, \ldots, S_L \mid E_{i_1}, \ldots, E_{i_x}, S_1, \ldots, S_{t-x}) = 0.$$

We can finally conclude that $$H(\vec{S} \mid E_{i_1}, \ldots, E_{i_x}) = \frac{t-x}{L} H(\vec{S}).$$

3. For any $x \ge t$, $H(\vec{S} \mid E_{i_1}, \ldots, E_{i_x}) = 0$: This follows immediately from the property that any subset $E' = \{E_{i_1}, \ldots, E_{i_t}\}$ of t shares is sufficient to reconstruct the vector $\vec{V}$ with probability 1.

Corollary 1

More generally, from any (t,N) systematic MDS code, a (t,L,n) strong ramp scheme can be derived with n=N−L and L<min(t,N−t).

Additional Links Between Ramp Schemes and MDS Codes

Any MDS code can be used to derive a systematic MDS Code: according to Theorem 1, if G is a generator matrix of a (t,N) MDS code, and $G_{\{1, \ldots, t\}}$ is the submatrix built from the first t rows of G, then the matrix $G' = G \cdot G_{\{1, \ldots, t\}}^{-1}$ is a generator matrix of a (t,N) systematic MDS code. Combining this with the construction described in the previous section leads to the following corollary:

Corollary 2

A (t,L,n) strong ramp scheme with n=N−L and L<min(t, N−t) can be constructed from any (t,N) MDS code.

Any strong ramp scheme is, by definition, a ramp scheme. In addition, setting L=t for a (t,L,n) linear ramp scheme results in a (t,N) MDS code, as any t or more non-corrupted encoded elements (shares) allow recovery of the information elements (secrets). These observations, together with the former results, allow the construction of any of the schemes starting from any other reference point. For example, based on the previous results, it is easy to show that:

Corollary 3

A (t,N) systematic MDS code with N=n can be derived from a (t,L,n) strong ramp scheme with L=t.

Corollary 4

A (t,L',n') strong ramp scheme with n'=n−L' and L'<min(t,n−t) can be derived from a (t,L,n) ramp scheme with L=t.

FIG. 6 summarises the links between the different schemes using the construction methods. The relation between ramp schemes and MDS codes: (generic) MDS codes can be used to construct systematic codes; these, in turn, can be used as a basis to construct strong ramp schemes.

Deriving a Strong Ramp Scheme from Shamir Scheme

We present an additional method to construct a strong ramp scheme, starting from Shamir secret sharing. As we will show in the next section, this scheme enables additional computation capabilities, in line with Shamir scheme (i.e., not limited by Galois Field $GF(2^q)$ operations that are most commonly used for Reed Solomon codes).

We start by observing a different construction method for Shamir secret sharing, which is equivalent to the one presented above. A polynomial of degree t−1 can be uniquely defined by its t coefficients, but it can also be uniquely defined by t of its points. In Shamir's scheme, only one secret is shared, thus only the constant coefficient, which is also the point of polynomial at the abscissa 0, is fixed. The other coefficients are then chosen randomly. But a ramp scheme based on a polynomial defined by its coefficients is not a strong ramp scheme. Thus in the following we will explain the steps to construct a strong ramp scheme using a polynomial defined by its points (rather than its coefficients), and we will prove that it is a strong ramp scheme.

Let $\vec{S}=(S_1, \ldots, S_L)^T$ be the secret vector to share and let $r_1, \ldots, r_{t-L}$ be t−L random values. The polynomial Q of degree t−1 is defined uniquely by the t points $(x_0, Q(x_0)=S_1), \ldots, (x_{L-1}, Q(x_{L-1})=S_L)$, $(x_L, Q(x_L)=r_1), \ldots, (x_{t-1}, Q(x_{t-1})=r_{t-L})$, where $x_0, \ldots, x_{t-1}$ are all distinct. From these t points, the value of the polynomial Q can be interpolated for any x:

$$Q(x) = \sum_{i=0}^{t-1} Q(x_i) \prod_{j \neq i} \frac{x - x_j}{x_i - x_j}.$$

Then, as in Shamir's scheme, shares are derived from the polynomial by computing new points.

FIG. 7 illustrates an algorithm 700 that summarises the process in which n shares are created. Given any subset of t of these shares, the polynomial Q can be reconstructed and the secret vector is given by $Q(x_0), \ldots, Q(x_{L-1})$.

The property that the scheme described in Algorithm 700 is a strong ramp scheme follows from Theorem 2: the linear scheme defined by the points $(x_0, Q(x_0)=S_1), \ldots, (x_{L-1}, Q(x_{L-1})=S_L), (x_L, Q(x_L)) \ldots, (x_{n+L-1}, Q(x_{n+L-1}))$ is a (t,N) systematic MDS code with N=n+L, since the polynomial can be interpolated from any t points, and the original information packets are the first points $Q(x_0), \ldots, Q(x_{t-1})$. Thus, puncturing (i.e. removing) the L elements related to the secrets generates a strong ramp scheme.

MPC with Strong Ramp Schemes

Linear secret sharing schemes can be used for secure evaluation of both arithmetic operations (e.g., addition, multiplication, etc.) and logical operations like comparison. Examples of practical MPC implementations based on Shamir secret sharing include SEPIA [6] and VIFF [11].

Strong ramp schemes theoretically have the same computational capabilities as the Shamir scheme, as both belong to the large family of linear schemes. We stress that ramp schemes share multiple secrets simultaneously, i.e., the resulting shares relate to a (block of) L secrets. Consequently, MPC computing based on ramp-generated shares is applicable to pairwise operations on the vector elements shared by input peers. Such operations are common in a number of scenarios, like e.g., rating services that aggregate user input on a number of items or vendors. This disclosure presents an example application of strong ramp-based MPC to troubleshooting unreachable network destinations.

There are two examples of strong ramp schemes: the first based on the Shamir scheme and the second based on Reed-Solomon MDS codes. Both may be bespoke implementations in Java, with operations on GF(p). They can be used as stand-alone, and have also been integrated into SEPIA [6], an efficient MPC library written in Java. It is optimised for parallel execution and specifically designed to aggregate network events and statistics from multiple domains.

FIG. 8 illustrates functional building blocks and corresponding API elements of the modified SEPIA library; modified components are highlighted.

SEPIA assumes a semi-honest adversary model, and uses a fully distributed architecture. FIG. 8 shows the functional building blocks and the most important API hooks.

The SEPIA components may be modified as highlighted in FIG. 8. Within SEPIA, the mpc library package contains an implementation of the Shamir secret sharing scheme and the corresponding operations. We extended the mpc library by integrating the Shamir and RS code based strong ramp schemes. Furthermore, we have added the implementation of the valid operations (addition) using the respective new secret sharing schemes in mpc.protocolPrimitives.operations and the states of the operations in mpc.protocolPrimitives.operationStates packages. Finally, we also added new Primitives classes, corresponding to the additional secret sharing scheme, and the abstract classes defining the MPC peer and protocol.

We also implemented the randomization pre-processing mechanism (in Randomization class) that ensures that the (multiple) secrets are mutually independent; this is a necessary condition for the entropy based security guarantee of the ramp schemes. This is done by adding a (locally generated) random sequence to the secrets on the input peer side and by removing the combination of random data after the result is returned to the (destination) input peers. The MPC system is used to compute the random data combination and share this information with all input peers, while keeping it private from other parties.

In one example, there are m=20 input peers, n=20 privacy peers and secret sharing threshold t=20.

In one example, MPC is applied to a network outage detection scenario where Internet service providers (ISPs) perform traffic data aggregation in a privacy-preserving way, to obtain additional information that can help determine the root cause of outages [13]. In MPC, such aggregation can be done using the multiset union operation, based on a Counting Bloom Filter (CBF) [12]. The process involves m ISPs (input peers) and n privacy peers, and proceeds as follows:

1. The input of each ISP (an input MPC peer) consists of a number of unreachable IP addresses.
2. The ISP creates a CBF based on the unreachable destinations, which will be the input for MPC.
3. The ISP generates n shares of the CBF and distributes them to the privacy peers.
4. Each privacy peer performs the multiset union by adding the shares of corresponding array elements of the CBF; it sends the combined share to all the other peers.
5. Each privacy peer reconstructs the aggregated CBF from the combined shares, and sends it to input peers.
6. Each input peer can check the resulting CBF locations with original data, and deduce whether the respective outage is local or global.

The proposed methods may be performed on an OpenStack cloud that includes six workers, with each worker being allocated 12 CPU cores of Intel Xeon X5650 2.67 GHz processor and a Gigabit LAN connection. Only ten virtual machines (VMs) may be used, where each machine has 2 GB memory and one virtual CPU based on KVM virtualization. Each machine runs Ubuntu 12.10 clouding amd64. The input peers and privacy peers are installed on these virtual machines and their operation is distributed uniformly across the ten machines.

In one example, each input peer shares 2,114 unreachable IP addresses; this corresponds to the highest number of unreachable IP addresses collected in the SWITCH network during Hurricane Sandy. This input data is then converted to a CBF of size 131,072 with 4B elements (around 1.05 MB of data).

Constructing a CBF from IP addresses and extracting the aggregate numbers of unreachable IP addresses from the result may take around 40 msec. Generating and adding random values and removing the randomization, after receiving the computation result is, combined, around 7 times faster, taking 5.8 msec. We note that for other applications that may not require CBF-type processing, the average amount of time for both randomization steps is (considering there are 131,072 CBF elements), 0.04 µsec and could be considered a minor addition to the MPC processing time.

Communication Overhead

We now address the communication overhead of the various schemes. We define this cost as the average volume of data downloaded and uploaded by each peer. Let $C_u^i$ denote the average volume of data uploaded (sent) from all input privacy peers and $C_d^i$ denote the average volume of data received by the same peers. Similarly, we denote the average volume of data uploaded and downloaded by privacy peers, respectively, as $C_u^p$ and $C_d^p$.

For each of the m input peers, theoretically, $$C_u^i = \frac{|S|}{L} \cdot n,$$

where |S| is the size of the input secret (all participants share secrets of the same size). The download data volume is given by $C_d^i = |S| \cdot n$, assuming (as is the case in SEPIA) that each of the n privacy peers communicates the result back to all input peers. Each privacy peer sends $$C_u^p = \frac{|S|}{L}(n-1) + |S| \cdot m,$$

as they communicate both with the input peers and all other privacy peers. They receive $$C_d^p = \frac{|S|}{L} \cdot m + \frac{|S|}{L} \cdot (n-1),$$

comprising the computed

The decrease in communication cost may be proportional to $$\frac{1}{L},$$

with a small practical difference of 7 kB on average (the input data being 1.05 MB in our scenario), which may be due to peer synchronization. The privacy peer upload volume is lower bounded by 21 MB, as each peer needs to forward the result back to input peers; this is obviously not impacted by L. We note that the download volumes $C_d^i$ and $C_d^p$ are similarly close to the theoretical estimates.

Security Trade-Off

Increasing the value of L may be beneficial for reducing both the computation and communication overhead. On the other hand, as per Definition 3, strong ramp schemes provide reduced security compared to the Shamir scheme, while they increase the security of (general) ramp schemes.

To explore the practical aspects of this reduced security, we consider a scenario where the input peers share L secrets, with a threshold t and the attacker has (t−1) shares. When utilizing the Shamir scheme, each of the secrets is shared separately and, by the entropy-based definition of the security of this scheme, the overall entropy of the set of L secrets, assuming independent and random variables, would equal the sum of individual entropy values. For strong ramp schemes, under the same conditions the entropy of the set would equal the entropy of a single secret; both schemes protect individual secrets (note the generic ramp scheme does not provide this guarantee).

Therefore, e.g. sharing a large set of secrets with strong ramp schemes could significantly reduce the uncertainty (entropy) of the set as a whole. This would directly impact the ability of an attacker to successfully complete a brute force attack, and consequently having larger size secrets would alleviate the security risks of applying strong ramp schemes. As a rule of thumb for the acceptable security (entropy) level of protection against a brute force attack on a secret (share), we consider the NIST recommendation [7] for a minimum (Level 2) password entropy of 10 bits; i.e., the L and t values should be chosen to result in the entropy of the shared set of secrets in line with this value. The sensitivity of data used for specific secure computations may be the deciding factor in choosing the appropriate secret sharing scheme.

Applicability of Strong Ramp Schemes

Computing based on ramp schemes may applicable to pairwise operations on vector elements. There is a range of scenarios involving data aggregation of heterogeneous (multiple) items that would benefit from the improvements brought by these schemes and could arguably tolerate a reduced security level. Rating services aggregate user input on a number of items or vendors; personalization, either using simpler mechanisms like collaborative filtering [27] or more complex schemes including variations of Matrix Factorization [30] may also be good candidate applications for ramp schemes. As shown above, operations on network data are also feasible.

The Choice of Strong Ramp Scheme

When comparing the merits of Shamir and RS based strong ramp schemes, we consider a broader range of computing platforms and applications. We argue that mobile devices e.g., smartphones would be a good candidate for input peers, as a large volume of mobile generated data is currently shared and processed. Using secret sharing and MPC would enable the confidentiality of such data when computing various data aggregates, or when securely storing the data on e.g., multiple storage platforms in personal clouds. RS-based schemes have a significant advantage in lower CPU use for generating shares and would therefore be a good choice in mobile data sharing and computing scenarios. This assumes that the privacy peers are based on more capable, e.g., cloud computing, platforms.

Overall, strong ramp schemes have a potential to provide significant benefits in regards to both communication costs and complexity and could be well suited to MPC applications in the emerging mobile network services that rely on private data. This disclosure proposes two construction methods for such schemes and experimentally evaluates their performance in a practical setting, using our implementation of ramp schemes within the MPC framework. In future work, we plan to extend this work to mobile device based MPC applications.

Both approaches are integrated into the SEPIA MPC framework [6]. We consider a realistic setting with 20 input and 20 privacy peers processing Internet Service Provider (ISP) outage monitoring data, and show that strong ramp schemes can reduce the computation overhead (measured by CPU time) by around 10 times and the communication cost per MPC input peer by 20 times, compared to the performance of the baseline Shamir scheme.

The following description provides more detailed information on MPC and in particular, to the multiplication of secret data where there are m input peers sharing L secrets each (using a specific secret sharing scheme) and 77 privacy peers that perform secure computing (MPC).

Figures 9, 10A, 10B, 10C:
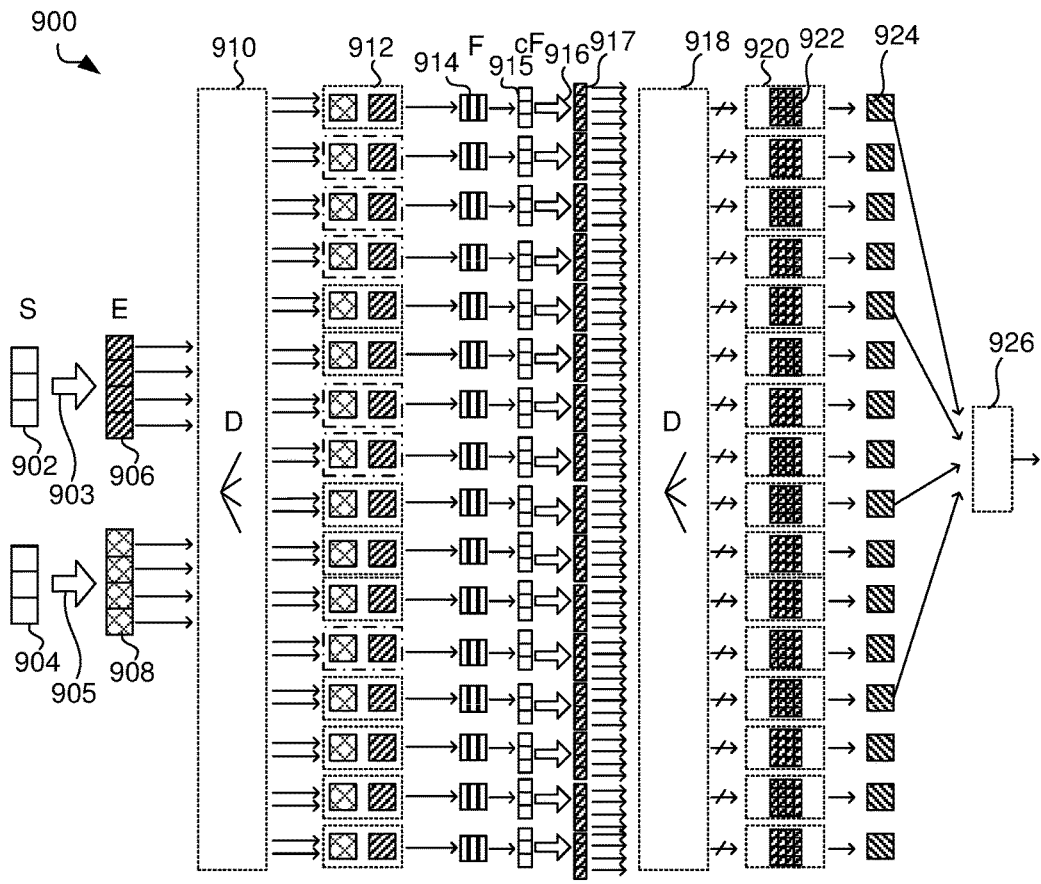
FIG. 9 illustrates an example of a data processing system for performing a multiplication between two sets of secret data.
FIG. 10a illustrates the association between privacy peers and matrix elements.
FIGS. 10b and 10c illustrate two ways to construct a distribution matrix.

FIG. 9 illustrates an example 900 comprising a first input peer and a second input peer. First input peer provides first secret data 902 and second input peer provides second secret data 904.

As described above, MPC operations using ramp schemes can be performed on vector elements, where the elements of the resulting vector equal the result of the selected operation performed on the corresponding elements of input secrets. E.g., for two secret vectors of L elements, $\vec{S}^1=(S_1^1, \ldots, S_L^1)^T$ (902 in FIG. 9) and $\vec{S}^2=(S_1^2, \ldots, S_L^2)^T$ (904 in FIG. 9), MPC addition using a ramp scheme results in $\vec{S}^3=((S_1^1+S_1^2), \ldots, (S_L^1+S_L^2))^T$.

While secure addition is an operation that can be achieved by locally adding the corresponding shares generated with a linear secret sharing scheme and subsequently reconstructing the resulting shares, secure multiplication, even for the most commonly used Shamir's scheme comprises two steps. The shares from e.g., two input peers are first multiplied locally, where each privacy peer multiplies corresponding shares from the two input peers; in the second step, re-sharing and degree reduction is performed by all privacy peers.

Specifically, when multiplication is done using Shamir scheme with a threshold t, the resulting polynomial is increased from a degree of (t−1) to 2·(t−1). Re-sharing and degree reduction reduces the polynomial degree to (t−1) and enables subsequent operations on shares corresponding to the multiplication result. Degree reduction is done using Lagrange interpolation, in line with the reconstruction mechanism for Shamir scheme.

Following a similar approach, it is possible to also perform multiplication using a MDS code based strong ramp scheme, however re-sharing and degree reduction are not achieved using the mechanisms that are customised for Shamir scheme, as the MDS based ramp scheme is based on matrix operations.

Multiplication

The aim is to produce a pairwise product of the corresponding elements of secret vectors $\vec{S}^1$ 902 and $\vec{S}^2$ 904, $\vec{S}^1 \Diamond \vec{S}^2$. To generate shares using a MDS code based strong ramp scheme, we use vectors $\vec{V}^1$ and $\vec{V}^2$, where the first L elements of each vector are, respectively, the elements of $\vec{S}^1$ and $\vec{S}^2$ and the remaining (t−L) elements are random numbers. For the sake of simplicity, we denote $\vec{V}^1=(V_1^1, \ldots, V_t^1)^T$ and $\vec{V}^2=(V_1^2, \ldots, V_t^2)^T$ and the pairwise product of vector elements $\vec{V}^1 \Diamond \vec{V}^2=(V_1^1 V_1^2, \ldots, V_t^1 V_t^2)^T$, noting that only the first L elements are relevant to the multiplication result.

Each of the two input peers generates n shares from the inputs (represented by arrows 903 and 905) and as described earlier with reference to FIGS. 2, 3 and 4, namely $$\vec{E}^1 = (E_1^1, \ldots, E_n^1)^T \qquad (906 \text{ in Fig. 9})$$
$$= ([\vec{S}_1]_1, \ldots, [\vec{S}_1]_n)^T$$

and $$\vec{E}^2 = (E_1^2, \ldots, E_n^2)^T \qquad (908 \text{ in Fig. 9})$$
$$= ([\vec{S}_2]_1, \ldots, [\vec{S}_2]_n)^T$$

using the MDS code generator matrix G.

For MPC multiplication, a distributor 910 distributes the shares to η privacy peers. The distributor may be a computer system that routes the shares according to a predefined routing pattern to the different peers.

We note that, for Shamir (and the Shamir based ramp) scheme, n=η, while this may not hold for the MDS ramp scheme. Similarly as for Shamir's scheme, where reconstruction assumes the availability of a recombination polynomial, decoding for an MDS based ramp scheme can be associated with a set of L recombination vectors $\vec{a}_1, \ldots \vec{a}_L$ of size n (e.g., $V_i^1=\Sigma_{k=1}^n a_{ik} \times E_k^1$). These recombination vectors can be derived from the generator matrix G and are used to reconstruct the L secrets.

Therefore, we can show that the product of two vector elements $V_i^1$ and $V_i^2$, for all $i=1, \ldots, L$, can be calculated as follows.

$$V_i^1 \cdot V_i^2 = \left(\sum_{k_1=1}^n a_{ik_1} \cdot E_{k_1}^1\right) \cdot \left(\sum_{k_2=1}^n a_{ik_2} \cdot E_{k_2}^2\right) \qquad (1)$$
$$= \sum_{k_1=1}^n \sum_{k_2=1}^n a_{ik_1} a_{ik_2} \cdot E_{k_1}^1 E_{k_2}^2$$

This can be further transformed by considering, separately, values of $k_1$ and $k_2$, with $k_2=k_1$ and $k_2>k_1$ as:

$$V_i^1 \cdot V_i^2 = \sum_{k_1=1}^n \sum_{k_2>k_1}^n a_{ik_1} a_{ik_2} \cdot (E_{k_1}^1 E_{k_2}^2 + E_{k_2}^1 E_{k_1}^2) + \qquad (2)$$
$$\sum_{k_1=1}^n (a_{ik_1})^2 \cdot E_{k_1}^1 E_{k_1}^2$$
$$= \sum_{k_1=1}^n \sum_{k_2>k_1}^n a_{ik_1} a_{ik_2} \cdot ((E_{k_1}^1 + E_{k_2}^1) \cdot (E_{k_1}^2 + E_{k_2}^2)) +$$

-continued $$\sum_{k_1=1}^{n}\left(2(a_{ik_1})^2 - \sum_{k=1}^{n} a_{ik_1} a_{ik}\right) E_{k_1}^1 E_{k_1}^2$$

It can be observed from Equation 1 that, in order to reconstruct the result of multiplication, multiples of shares with selected indexes (received from input peers) are available to reconstruct the multiplication result. Similarly, equation 2 indicates that multiples of specific combinations of shares can also be utilised for reconstruction. We thus introduce a Distribution matrix D, that determines the allocation of shares to specific privacy peers for MDS code based ramp scheme. Data that is indicative of the distribution matrix is stored on data memory of a computer system and available to all processing peers, such as on a cloud storage system.

FIG. 10a illustrates the association between privacy peers (also referred to as 'processing peers' or simply 'peers') and matrix elements where peers are denoted correspondingly (to elements of D), with $P_{i,j}$, where i, j=1, . . . , n. In FIGS. 9 and 10, an example peer $P_{1,1}$ is referenced by numeral 912.

Note that for Shamir secret sharing, there is no need for D as each privacy peer has a single index and receives a corresponding share (with the same index) from the input peers.

FIGS. 10b and 10c illustrate two ways to construct D: first, a naive method (FIG. 10b), in line with Equation 1, and a composite method (FIG. 10c), that follows Equation 2.

For the naive method in FIG. 10b, each privacy peer $P_{k_1,k_2}$, where $k_1$, $k_2$ take values between =1, . . . , n, is allocated shares ($E_{k_1}^1$, $E_{k_2}^2$).

In the composite method in FIG. 10c, shares are allocated such that peer $P_{k_1,k_2}$ receives ($E_{k_1}^1$, $E_{k_2}^2$) for $k_2=k_1$ and ($E_{k_1}^1+E_{k_2}^2$), ($E_{k_1}^2+E_{k_2}^2$) for $k_2>k_1$. In FIG. 9, the peers with $k_2<k_1$ are not used under the composite method and are drawn as boxes with a dash-dotted lines.

Distributor 910 may be implemented as a module, such as a function of software block, having two inputs for the share data and two inputs for the share index. More generally, distributor 910 may represent the matrix D in a linear form and may have a single input for the share data, a single input for the share index and a further input for the input index. The code of the distributor according to FIG. 10b may be:

```
if (input_index = 1) {
    for i=1 to number_of_shares {
        send_share_data_to_privacy_peer(share_index,i);
    }
}
elseif (input_index = 2) {
    }
    for i=1 to number_of_shares {
        send_share_data_to_privacy_peer(i, share_index);
    }
}
```

The code above shows that distributor 910 can operate on a single input only and can distribute shares provided with only the first input index or only the second input index, which will be utilised further below.

We now outline the steps for multiplication as performed by processors of distributor 910 and peers, such as peer 912. Each privacy peer $P_{k_1,k_2}$, such as peer 912, first performs the local multiplication of received shares (or share combinations), as per Equations 1 and 2. We refer to the resulting values as $F_{k_1,k_2}$ for simplicity, where $F_{k_1,k_2}=E_{k_1}^1 E_{k_2}^2$ from the Equation 1 and following the naive distribution method and for the composite method: $F_{k_1,k_2}=E_{k_1}^1 E_{k_2}^2$ for $k_2=k_1$; $F_{k_1,k_2}=(E_{k_1}^1+E_{k_2}^1)(E_{k_1}^2+E_{k_2}^2)$ for $k_2>k_1$, as per Equation 2. The resulting value determined by peer 912 is labelled by reference numeral 914 in FIG. 9.

Similarly, we denote the values of recombination elements from the same equations, required to reconstruct the L secrets, as $c_{ik_1,k_2}$, where $c_{ik_1,k_2}=a_{ik_1}a_{ik_2}$ from Equation 1 and from Equation 2: $c_{ik_1,k_2}=a_{ik_1}a_{ik_2}$ for $k_2>k_1$; $c_{ik_1,k_2}=2(a_{ik_1})^2-\Sigma_{k=1}^{n}a_{ik_1}a_{ik}$ for $k_2=k_1$.

We note that, for either distribution method, having a local (to each privacy peer) product of shares or share combinations is not equivalent to having shares of the product of two secrets. To enable subsequent use of the shares of the computing result (e.g., for subsequent addition or multiplication with another secret vector), resharing and degree reduction have to be performed by the privacy peers.

For degree reduction, each peer computes $c_{ik_1,k_2}F_{k_1,k_2}$ for all i=1, . . . , L vector elements (note $C_{ik_1,k_2}$ are constants known to the peers and cF can be computed directly from the $F_{k_1,k_2}$ values). In the example of FIG. 9 L=3 and the three product values for cF for peer 912 are labelled as 915.

In subsequent resharing, each peer generates n shares of the computed product, using the share generating mechanism and the generator matrix G. This generation of shares is represented by arrow 916. This procedure is basically identical to the generation step represented by arrows 903 and 905 and again generates for shares for each peer, such as four shares 917 for peer 912.

The shares $[c_{1k_1,k_2}\cdot F_{k_1,k_2}, \ldots, c_{Lk_1,k_2}\cdot F_{k_1,k_2}]_j$ for j=1, . . . , n are distributed to all privacy peers $P_{k_1,k_2}$, by distributor 918 following the selected distribution method. That is, the distributor 918 is identical to distributor 910 but shown separately in FIG. 9 to illustrates the sequence of steps performed by the distributor 910. In this step, distributor 918 receives the four shares 917 on the first input, that is, associated with input_index=1. As a result, distributor 918 distributes the first of the four shares 917 to all peers in the first column of D, the second of the four shares 917 to all peers in the second column of D and so on. Since each peer has generated four shares and distributor 918 makes four copies of each share, each peer receives 16 shares from the distributor 918. For example, peer 920 (which is the same peer as 912) receives 16 shares 922.

In one example, distributor 918 is not a separate module but each peer is programmed to distribute their shares 917 to the appropriate peers together with the respective share index.

Thus after the distribution, each peer $P_{k'_1,k'_2}$ possesses a share from every other peer, $[c_{1k_1,k_2}\cdot F_{k_1,k_2}, \ldots, c_{Lk_1,k_2}\cdot F_{k_1,k_2}]_{k'_1,k'_2}$ for all $k_1$ and $k_2$ in 1, . . . , n.

In the final step of degree reduction, each peer locally sums all the available (η) shares 922. This results in a final share 924:

$$\sum_{k_1=1}^{n}\sum_{k_2=1}^{n}[c_{1k_1,k_2}\cdot F_{k_1,k_2}, \ldots, c_{Lk_1,k_2}F_{k_1,k_2}]_{k'_1,k'_2} = \left[\sum_{k_1=1}^{n}\sum_{k_2=1}^{n}c_{1k_1,k_2}\cdot F_{k_1,k_2}, \ldots, \sum_{k_1=1}^{n}\sum_{k_2=1}^{n}c_{Lk_1,k_2}F_{k_1,k_2}\right]_{k'_1,k'_2}. \quad (3)$$

This is equivalent to each peer having the shares of the multiplication result $[V_1^1\cdot V_1^2, \ldots, V_L^1\cdot V_L^2]_{k'_1,k'_2}$ (note the equivalence with terms of Equations 1 and 2, as $F_{k_1,k_2}$ and $c_{ik_1,k_2}$ were originally defined by those equations). In order to reconstruct the result of the product, an aggregator 926 collects the shares from the peers and reconstructs the product of the secret data by applying the reconstruction operation according to generator matrix G. In one example, the aggregator 926 only collects shares from the peers in the diagonal of distribution matrix D, that is, peers $P_{i,j}$ where i=j. While this allows the reconstruction of the secret product, it may be an advantage to collect more shares or even all shares in order to check the shares against the final result to identify peers that operate incorrectly.

Security

We note that the security of the (n,t) scheme is preserved for both distribution methods: no combination of less than t privacy peers will result in t available shares.

For a vector secret $\vec{S}$ and the corresponding n shares $E_1, \ldots, E_n$, a (t, L, n) strong linear ramp scheme satisfies the following properties, for any set of indices $i_1, \ldots, i_x$, where x is the number of available shares:

$$H(\vec{S} \mid E_{i_1}, \ldots, E_{i_x}) = \qquad (4)$$

$$\begin{cases} H(\vec{S}), & \text{if } x < t - L \\ H(S_{j_1}, \ldots, S_{j_{t-x}} \mid E_{i_1}, \ldots, E_{i_x}) = \frac{t-x}{L} H(\vec{S}), \\ & \text{if } t - L \le x < t \text{ for any set of indices } j_1, \ldots, j_{t-x} \\ 0, & \text{if } t \le x \le n \end{cases}$$

The definition of strong ramp scheme requires that the entropy $H(\vec{\alpha})$ of any subset of secret (vector) elements (rather than just the secret as a whole) is bounded to a specific value of $$\frac{t-x}{L} H(\vec{S}),$$

which maximizes the uncertainty provided by such a scheme.

Considering the naive method, the properties of the secret sharing scheme are preserved directly, i.e., by their definition, as each peer can only have a single unique share and the combination of shares from (t−1) privacy peers can result in at most (t−1) unique shares. In the composite method, the peers receive either unique shares, or a sum of (two) such shares. As the shares are independent and uniformly distributed random variables, the sum on a finite field of two such variables is also normally distributed. In fact if $E_1$ and $E_2$ are two independent and uniformly distributed random variables over $$GF(p), \text{ for all } z \text{ in } GF(p), P(E_1 + E_2 = z) = \frac{1}{p} = P(E_1 = x) = P(E_2 = y)$$

for all x and y in GF(p), as per the following:

$$P(E_1 + E_2 = z) = \sum_{x \in GF(p)} P(E_1 = x, E_2 = z - x) \qquad (5)$$

-continued $$= \sum_{x \in GF(p)} P(E_1 = x) P(E_2 = z - x)$$

$$= \frac{1}{p}$$

Thus for all z and for all x in GF(p), y such that x+y=z exists and is unique (equal to z−x). It follows that $H(E_1+E_2)=H(E_1)=H(E_2)$. It also follows that $$H(E_1 \mid E_1 + E_2) = H(E_1, E_1 + E_2) - H(E_1 + E_2) \qquad (6)$$

$$= H(E_1 + E_2 \mid E_1) + H(E_1) - H(E_1 + E_2)$$

$$= H(E_2) + H(E_1) - H(E_2)$$

$$= H(E_1).$$

Consequently, receiving a share $(E_1+E_2)$ does not provide any information about either $E_1$ or $E_2$. Furthermore, $H(E_1+E_2|E_1, E_2)=0$, as knowing $E_1$ and $E_2$ is sufficient to reconstruct $E_1+E_2$. With these observations, we can easily show that Equation 4 becomes 7, therefore preserving the security properties of the strong ramp schemes.

$$H(\vec{S} \mid E_{i_1}, \ldots, E_{i_x}) \ge \qquad (7)$$

$$\begin{cases} H(\vec{S}), & \text{if } x < t - L \\ H(S_{j_1}, \ldots, S_{j_{t-x}} \mid E_{i_1}, \ldots, E_{i_x}) \ge \frac{t-x}{L} H(\vec{S}), \\ & \text{if } t - L \le x < t \text{ for any set of indices } j_1, \ldots, j_{t-x} \\ 0, & \text{if } t \le x \le \eta \end{cases}$$

Multiplication introduces a larger number of privacy peers (to enable reconstruction), than what is used for addition. We can view this increased number of privacy peers as a direct overhead (in the communication costs), therefore we aim to minimise this number. We note that input peers and privacy peers incur a communication cost for distributing shares, while the privacy peers need to communicate for re-sharing as part of the reduction process.

Although the basic matrix of privacy peers includes $n^2$ elements, all of them are non-0 only in the naive distribution method of FIG. 10b. Therefore, for this method $\eta=n^2$ peers need to receive the n shares related to each set of L secrets. This number is reduced to $\eta=n\cdot(n+1)/2$ peers using the composite method of FIG. 10c, with the corresponding savings in communication costs between both input peers and privacy peers (for share distribution), and the privacy peers (for re-sharing and size reduction).

The second and equally important advantage of the composite method is the symmetrical nature of the Distribution matrix (in regards to the way the individual input peers distribute their shares). We note that a share with the same index from all input peers will be allocated to any privacy peer $P_{k_1,k_2}$. This enables direct use of such shares for subsequent addition, or another multiplication. E.g., using the composite method, the addition of shares from two input peers, distributed to $P_{k_1,k_2}$, can involve the following options. For $k_2=k_1$, $P_{k_1,k_2}$ has the shares $(E_{k_1}^{\ 1}, E_{k_1}^{\ 2})$; the corresponding shares for $k_2>k_1$ are $(E_{k_1}^{\ 1}+E_{k_2}^{\ 1}), (E_{k_1}^{\ 2}+E_{k_2}^{\ 2})$. It can be shown that the shares resulting from addition, for $k_2=k_1$, can be used for further operations. For $k_2>k_1$, addition results in $$(E_{k_1}^1+E_{k_2}^1)+=(E_{k_1}^2+E_{k_2}^2)=(E_{k_1}^1+E_{k_1}^2)+(E_{k_2}^1+E_{k_2}^2) \qquad (8)$$

which follow the same distribution as required for multiplication. This is another advantage of the composite method over the naïve method.

Considering the system complexity, both input and privacy peers maintain knowledge of the Distribution matrix. We note that in the composite method input peers generate (additional) composite shares, however this is arguably of a minimal complexity increase, as it only involves Galois Field addition.

Other construction methods for the Distribution matrix that satisfy the requirement of re-sharing and reconstruction may also be feasible.

In one example, the privacy peers, such as 912/920 perform a further step of multiplication, such as determining A*B*C after determining A*B as described with reference to FIG. 9. In that case, peer 912/920 stores result 924 on data memory and the distributor 910 receives the shares related to the third secret data C at the second input port or associated with input_index=2. Accordingly, distributor 910 distributes the second shares related to the third secret data to the peers, such as peer 912. As a result, the first element of the pair received by peer 912 is the result 924 and the second element is a share of the third secret data. This process can be performed iteratively for multiple steps of addition and multiplication to perform a complex operation on secret data without disclosing the data to the processing peers, such as 912/920.

Figure 11:
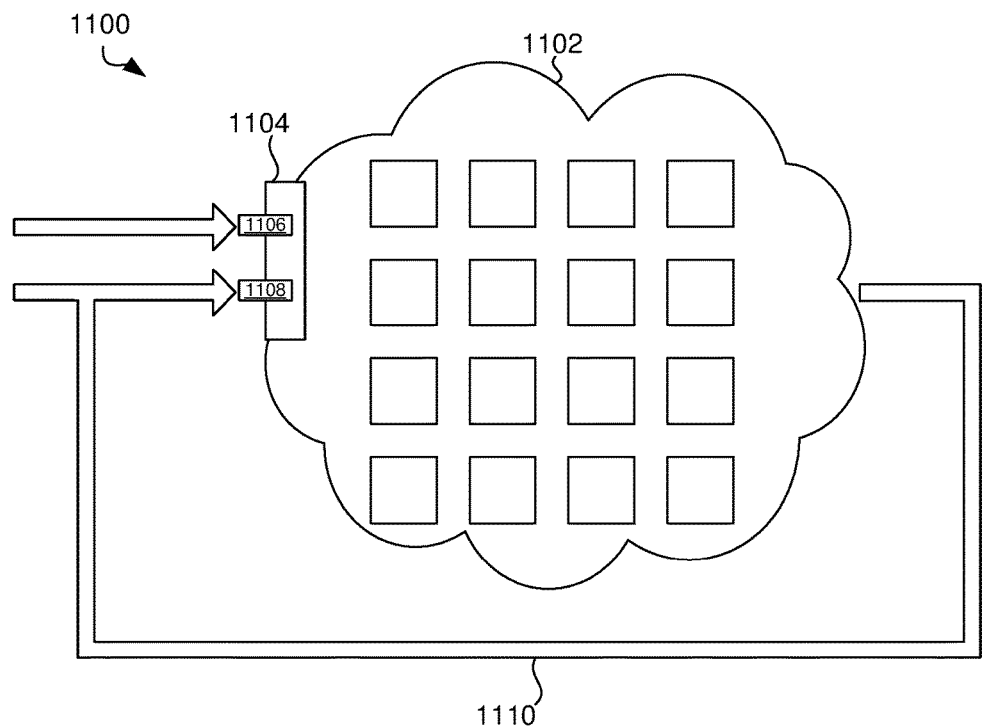
FIG. 11 schematically illustrates an iterative computation of a complex expression by a computer network.

FIG. 11 schematically illustrates this iterative computation by a computer network 1100 comprising a cloud 1102 of 16 processing peers. Of course, the number of processing peers may be different and may depend on the distribution scheme and the number of shares as described earlier. A controller 1104 is connected to each of the peers in cloud 1102 and controls the distribution of shares. The controller has a first input port 1106 and a second input port 1108. The controller 1104 as well as the peers 1102 comprise processors, data memories and program memories as described with reference to FIG. 1.

In the first iteration, controller 1104 receives first shares of first secret data at first input port 1106 and second shares of second secret data on second input port 1108. The controller 1104 then distributes the shares as described above to the peers of cloud 1102. The peers 1102 process the shares to determine a product of shares and each peer feeds its product of shares back to the second port 1108 (indicated by arrow 1110). As a result, this feedback is performed 16 times for 16 peers. Controller 1104 distributes these shares as described above and each of the peers 1102 receives 16 shares stores them on data memory. Then, each of the peers 1102 sums the received shares to determine a share of the product (rather than a product of shares).

Each of the peers 1102 stores its share of the product as one element of its pair. Controller 1104 receives third secret data on first input port 1106 and distributes the shares of that data to the processing peers 1102 such that each peer receives one share as the second element of its pair of shares. The process can then be repeated multiple times until finally, the controller 1104 can collect the shares from the peers 1102 to reconstruct the result as described above. This way, a complex operation, such as (A*B)+(C*D) can be computed.

Figure 12A:
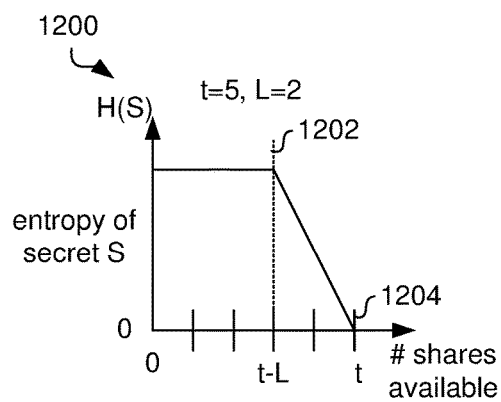
FIGS. 12a and 12b illustrate the difference in entropy between ramp sharing with random data elements (12a) and without random data elements (12b) over the number of available shares.

FIG. 12a illustrates a graph 1200 of the entropy H(S) over the number of available shares in the case of added random data as described with reference to FIG. 4. Graph 1200 shows that the entropy remains constant up to the second threshold 1202 and then linearly decreases to the first threshold 1204 where the entropy is zero, which means the secret data can be readily determined.

Figure 12B:
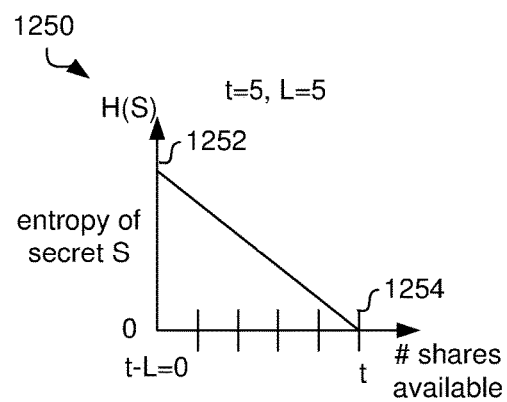

FIG. 12b illustrates a graph 1250 of the entropy H(S) over the number of available shares in the case without added random data as described with reference to FIG. 3. Unlike the graph in FIG. 12a, the second threshold 1252 is at zero, which means that the entropy decreases with the first available share down to the first threshold 1254 where the entropy is zero. Since the entropy is a measure of security of the secret data, the secret is less secure in FIG. 12b. Especially over the range where graph 1200 is constant the graphs 1200 and 1250 show that the addition of random data increases the security of the secret data.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

REFERENCES

[1] Bai, Li. A Strong Ramp Secret Sharing Scheme Using Matrix Projection. *Proceedings of the* 2006 *International Symposium on on World of Wireless, Mobile and Multimedia Networks* in WOWMOM '06, pages 652-656, Washington, D.C., USA, 2006. IEEE Computer Society.

[2] Amos Beimel. Secret-Sharing Schemes: A Survey. *IWCC*, pages 11-46, 2011.

[3] Ben-Or, Michael and Goldwasser, Shafi and Wigderson, Avi. Completeness theorems for non-cryptographic fault-tolerant distributed computation. *Proceedings of the twentieth annual ACM symposium on Theory of computing* in STOC '88, pages 1-10, New York, N.Y., USA, 1988. ACM.

[4] Blakley, G R and Meadows, Catherine. Security of ramp schemes. *Proceedings of CRYPTO* 84 *on Advances in cryptology*, pages 242-268, 1985. Springer-Verlag.

[5] Carlo Blundo and Alfredo De Santis and Ugo Vaccaro. Randomness in Distribution Protocols. *Information and Computation*, 131(2):111-139, 1996.

[6] Burkhart, Martin and Strasser, Mario and Many, Dilip and Dimitropoulos, Xenofontas. SEPIA: privacy-preserving aggregation of multi-domain network events and statistics. *Proc. USENIX Security '10*, 2010.

[7] William E. Burr and Donna F. Dodson and Elaine M. Newton and Ray A. Perlner and W. Timothy Polk and Sarbari Gupta and Emad A. Nabbus. Electronic Authentication Guideline. Technical report, National Institute of Standard and Technology, 2011.

[8] Chen, Hao and Cramer, Ronald and Goldwasser, Shafi and Haan, Robbert7 and Vaikuntanathan, Vinod. Secure Computation from Random Error Correcting Codes. In Naor, Moni, editors, *Advances in Cryptology—EUROCRYPT 2007* in Lecture Notes in Computer Science, pages 291-310. Springer Berlin Heidelberg, 2007.

[9] Cramer, Ronald and Damgård, Ivan. Multiparty Computation, an Introduction. *Contemporary Cryptology* in Advanced Courses in Mathematics CRM Barcelona. Birkhäuser, 2005.

[10] Ronald Cramer and Vanesa Daza and Ignacio Gracia and Jorge Jiménez Urroz and Gregor Leander and Jaume Mart-Farré and Carles Padró. On Codes, Matroids, and Secure Multiparty Computation From Linear Secret-Sharing Schemes. *IEEE Transactions on Information Theory*, 54(6):2644-2657, 2008.

[11] Damgård, Ivan and Geisler, Martin and Krøigaard, Mikkel and Nielsen, JesperBuus. Asynchronous Multiparty Computation: Theory and Implementation. In Jarecki, Stanisław and Tsudik, Gene, editors, PKC'09 in Lecture Notes in Computer Science, pages 160-179. Springer Berlin Heidelberg, 2009.

[12] Djatmiko, Mentari and Schatzmann, Dominik and Dimitropoulos, Xenofontas and Friedman, Arik and Boreli, Roksana. Federated Flow-based Approach for Privacy Preserving Connectivity Tracking. *Proceedings of the Ninth ACM Conference on Emerging Networking Experiments and Technologies* in CoNEXT '13, pages 429-440, New York, N.Y., USA, 2013. ACM.

[13] Mentari Djatmiko and Dominik Schatzmann and Arik Friedman and Xenofontas Dimitropoulos and Roksana Boreli. Collaborative Network Outage Troubleshooting with Secure Multiparty Computation. *IEEE Communications Magazine*, 2013.

[14] Elbert, B. R. *Introduction to Satellite Communication* of Artech House space technology and applications library. Artech House, Third edition, 2008.

[15] Huang, Yan and Chapman, Peter and Evans, David. Privacy-preserving Applications on Smartphones. *Proceedings of the 6th USENIX Conference on Hot Topics in Security* in HotSec'11, pages 4-4, Berkeley, Calif., USA, 2011. USENIX Association.

[16] Mitsugu Iwamoto and Hirosuke Yamamoto. Strongly secure ramp secret sharing schemes for general access structures. *Inf. Process. Lett.*, 97(2):52-57, 2006.

[17] Jackson, Wen-Ai and Martin, Keith M. A combinatorial interpretation of ramp schemes. *Australasian Journal of Combinatorics*, 14:51-60, 1996.

[18] Hugo Krawczyk. Secret Sharing Made Short. *CRYPTO*, pages 136-146, 1993.

[19] Jérôme Lacan and Jérôme Fimes. A Construction of Matrices with No Singular Square Submatrices. *International Conference on Finite Fields and Applications*, pages 145-147, 2003.

[20] Lin, Shu and Costello, Daniel J. *Error control coding*, volume 123. Prentice-hall Englewood Cliffs, 2004.

[21] Nikolaenko, Valeria and Ioannidis, Stratis and Weinsberg, Udi and Joye, Marc and Taft, Nina and Boneh, Dan. Privacy-preserving Matrix Factorization. *Proceedings of the 2013 ACM SIGSAC Conference on Computer and Communications Security* in CCS '13, pages 801-812, New York, N.Y., USA, 2013. ACM.

[22] Paterson, MauraB. and Stinson, DouglasR. A simple combinatorial treatment of constructions and threshold gaps of ramp schemes. *Cryptography and Communications*, 5(4):229-240, 2013.

[23] Pieprzyk, Josef and Zhang, Xian-Mo. Ideal Threshold Schemes from MDS Codes. In Lee, PilJoong and Lim, ChaeHoon, editors, *Information Security and Cryptology—ICISC 2002* in Lecture Notes in Computer Science, pages 253-263. Springer Berlin Heidelberg, 2003.

[24] Plank, J. S. and Lihao Xu. Optimizing Cauchy Reed-Solomon Codes for Fault-Tolerant Network Storage Applications. *NCA 2006*, pages 173-180, 2006.

[25] Michael Rabin. Efficient dispersal of information for security, load balancing, and fault tolerance. *Journal of the ACM*, 36:335-348, 1989.

[26] Reed, I. S. and Solomon, G. Polynomial Codes Over Certain Finite Fields. *Journal of the Society for Industrial and Applied Mathematics*, 8(2):300-304, 1960.

[27] Schafer, J Ben and Frankowski, Dan and Herlocker, Jon and Sen, Shilad. Collaborative filtering recommender systems. *The adaptive web*, pages 291-324. Springer, 2007.

[28] Shamir, Adi. How to share a secret. *Commun. ACM*, 22(11):612-613, 1979.

[29] Shannon, Claude E. A Mathematical Theory of Communication. *Bell System Technical Journal*, 27:379-423, 623-656, 1948.

[30] Vallet, David and Friedman, Arik and Berkovsky, Shlomo. Matrix Factorization without User Data Retention. *The 18th Pacific-Asia Conference on Knowledge Discovery and Data Mining* (PAKDD), pages 569-580, 2014. Springer International Publishing.

[31] Yamamoto, Hirosuke. Secret sharing system using (k, L, n) threshold scheme. *Electronics and Communications in Japan (Part I: Communications)*, 69(9):46-54, 1986.

The invention claimed is:

1. A computer implemented method for generating multiple shares of secret data represented by secret data elements based on a first threshold for the number of shares that allow determining the secret data, the method comprising:
   determining multiple shares based on the multiple secret data elements and based on one or more random data elements, wherein
   determining the multiple shares comprises for each of the multiple shares determining a linear combination of the multiple secret data elements and the random data elements based on one of multiple sets of coefficients,
   the multiple sets of coefficients are linearly independent,
   the distance between each of the multiple sets of coefficients is maximal,
   each of the multiple sets of coefficients comprises exactly the first threshold number of coefficients and comprises exactly the number of secret data elements plus the number of random data elements.

2. The method of claim 1, wherein each of the multiple sets of coefficients is representative of a row or column of a code generator matrix.

3. The method of claim 1, wherein the multiple sets of coefficients are coefficients of a generator matrix of a systematic maximum distance separable code.

4. The method of claim 1, wherein determining the multiple shares comprises determining the multiple shares such that L secret data elements can be determined based on a first threshold number t of the multiple shares, and determining the multiple shares comprises determining the multiple shares based on t L random data elements.

5. The method of claim 4, wherein determining the multiple shares comprises determining n shares, and at least n−t+L sets of coefficients comprise at least two coefficients greater than zero.

6. The method of claim 1, further comprising:

receiving configuration data indicative of the threshold number t, a value n indicative of how many shares are to be determined and a value L indicative of how many shares are required to allow a reduction of uncertainty in relation to the multiple secret data elements; and determining a measure of redundancy based on t, n and L.

7. The method of claim 6, wherein determining the measure of redundancy comprises calculating n−t+L.

8. The method of claim 6, further comprising determining at least part of a generator matrix for a maximum distance separable code with t input values and n+L output values.

9. The method of claim 6, further comprising determining a number of random data elements to be added to the multiple secret data elements based on t and L.

10. The method of claim 9, wherein determining the number of random data elements comprises calculating t−L.

11. A non-transitory computer readable medium with an executable program stored thereon that when executed by a computer causes the computer to perform the method of claim 1.

12. A computer implemented method for performing an operation between first secret data and second secret data, the method comprising:

performing the method of claim 1 to determine first shares of the first secret data;

performing the method of claim 1 to determine second shares of the second secret data;

generating multiple pairs, each of the multiple pairs comprising a first element based on the first shares and a second element based on the second shares to allow performing the operation between the first secret data with the second secret data based on distributed processing of each of the multiple pairs.

13. The method of claim 12, wherein the operation is multiplication of the first secret data with the second secret data.

14. The method of claim 12, wherein the first element is one of the first shares and the second element is one of the second shares, and generating the multiple pairs of shares comprises generating all possible combinations of the first shares with the second shares.

15. The method of claim 12, wherein the first element is based on a sum of two first shares and the second element is based on a sum of two second shares.

16. The method of claim 15, wherein generating the multiple pairs is according to:

$$\begin{vmatrix} E_1^1, E_1^2 & 0 & \ldots & 0 \\ E_1^1 + E_2^1, & E_1^2 + E_2^2 & & \vdots \\ \vdots & & \ddots & 0 \\ E_1^1 + E_n^1, & E_1^2 + E_n^2 & \ldots & E_n^1, E_n^2 \end{vmatrix}$$

where $E_i^1$ is an i-th first share and $E_j^2$ is an j-th second share.

17. The method of claim 12 further comprising:

combining the first element with the second element of each pair to obtain combination result for each pair;

determining multiple combination values for each pair based on the combination result and a vector of distribution values;

determining shares of the multiple combination values by performing the method of claim 1 based on the multiple combination values for each pair; and distributing the multiple shares to multiple processing peers to allow performing the operation between the first secret data with second secret data based on distributed processing of each of the shares of the multiple combination values.

18. A non-transitory computer readable medium has an executable program stored thereon that when executed by a computer causes the computer to perform the method of claim 12.

19. A computer system for generating shares of secret data represented by secret data elements based on a first threshold for the number of shares that allow determining the secret data, the system comprising:

an input port to receive the multiple secret data elements;

a processor to determine multiple shares based on the multiple secret data elements and based on one or more random data elements; and an output port to send each of the multiple shares to a receiving computer system, wherein determining the multiple shares comprises for each of the multiple shares determining a linear combination of the multiple secret data elements and the random data elements based on one of multiple sets of coefficients, the multiple sets of coefficients are linearly independent, the distance between each of the multiple sets of coefficients is maximal, and each of the multiple sets of coefficients comprises exactly the first threshold number of coefficients and comprises exactly the number of secret data elements plus the number of random data elements.

20. A computer system for performing an operation between first secret data and second secret data, the computer system comprising:

an input port to receive the first secret data and the second secret data;

a processor to perform the method of claim 1 to determine first shares of the first secret data;

perform the method of claim 1 to determine second shares of the second secret data;

generate multiple pairs, each of the multiple pairs comprising a first element based on the first shares and a second element based on the second shares to allow performing the operation between the first secret data with second secret data based on distributed processing of each of the multiple pairs; and an output port to send the multiple pairs to one or more receiving computer systems.

* * * * *